(12) United States Patent
Morgan

(10) Patent No.: US 10,724,248 B1
(45) Date of Patent: Jul. 28, 2020

(54) LIGHTWEIGHT ORNAMENTAL BEAMS

(71) Applicant: Bret Morgan, Sherwood, OR (US)

(72) Inventor: Bret Morgan, Sherwood, OR (US)

(*) Notice: Subject to any disclaimer, the term of this patent is extended or adjusted under 35 U.S.C. 154(b) by 0 days.

(21) Appl. No.: 16/237,655

(22) Filed: Dec. 31, 2018

Related U.S. Application Data

(60) Provisional application No. 62/735,016, filed on Sep. 21, 2018.

(51) Int. Cl.
*E04F 13/08* (2006.01)
*F16L 3/26* (2006.01)

(52) U.S. Cl.
CPC ...... *E04F 13/0869* (2013.01); *E04F 13/0873* (2013.01); *F16L 3/26* (2013.01)

(58) Field of Classification Search
CPC ...... E04F 13/0869; E04F 13/0873; F16L 3/26
USPC ...................... 174/155, 650; 248/68.1, 74.1
See application file for complete search history.

(56) References Cited

U.S. PATENT DOCUMENTS

| | | | | |
|---|---|---|---|---|
| 3,325,128 | A * | 6/1967 | Elleboudt | F16B 2/22 248/68.1 |
| 3,692,920 | A * | 9/1972 | Santarelli | F16L 3/26 174/501 |
| 3,725,568 | A | 4/1973 | Stanley | |
| 3,761,603 | A * | 9/1973 | Hays | H02G 3/0437 174/101 |
| 4,718,213 | A | 1/1988 | Butterfield | |
| 4,945,982 | A | 8/1990 | Das | |
| D342,523 | S * | 12/1993 | Morgan | D13/156 |
| D354,904 | S * | 1/1995 | Halsten | D8/356 |
| 5,383,318 | A * | 1/1995 | Kelley | H02G 3/0418 248/49 |
| D402,262 | S * | 12/1998 | Scherer | D13/155 |
| D402,263 | S * | 12/1998 | Scherer | D13/155 |
| 5,949,025 | A * | 9/1999 | Nagai | H02G 3/0437 174/101 |
| 6,012,683 | A * | 1/2000 | Howell | F16L 3/26 174/101 |
| 6,130,268 | A | 10/2000 | Murray | |
| 6,360,051 | B1 * | 3/2002 | Daoud | G02B 6/3801 385/134 |
| D471,877 | S * | 3/2003 | Dyer | D13/155 |
| 6,722,098 | B2 | 4/2004 | Platt | |
| 6,972,367 | B2 * | 12/2005 | Federspiel | H02G 3/0418 174/481 |
| D539,228 | S * | 3/2007 | Toikka | D13/155 |
| 7,501,576 | B2 | 3/2009 | Gagliardi | |
| 7,578,251 | B1 | 8/2009 | Gribble | |

(Continued)

OTHER PUBLICATIONS

Elmwood Reclaimed Timber, "Reclaimed Wood, Wide Plank Flooring, Antique Stone," http://www.elmwoodreclaimedtimber.com, at least as early as Sep. 28, 2017, 6 pages.

(Continued)

*Primary Examiner* — Joshua K Ihezie
(74) *Attorney, Agent, or Firm* — Green, Howard & Mughal, LLP; Karen Dana Oster

(57) ABSTRACT

An ornamental beam includes a sleeper and a cover. The sleeper preferably has a plurality of sleeper support ribs that may have a bore therethrough. The cover preferably has a plurality of cover support ribs. When the ornamental beam is assembled with the cover covers the sleeper. A method for installing the ornamental beam is also described.

18 Claims, 36 Drawing Sheets

(56) References Cited

U.S. PATENT DOCUMENTS

| | | | |
|---|---|---|---|
| D651,570 S | 1/2012 | Donowho et al. | |
| 8,157,222 B1 * | 4/2012 | Shirey | H02G 3/32 |
| | | | 248/68.1 |
| 8,173,902 B2 * | 5/2012 | Smallhorn | H02G 3/32 |
| | | | 174/135 |
| 8,205,397 B2 | 6/2012 | Nark | |
| 8,294,030 B2 * | 10/2012 | Pollard, Jr. | H02G 3/30 |
| | | | 174/155 |
| D691,875 S * | 10/2013 | Ganski | D8/356 |
| D691,878 S * | 10/2013 | Ganski | D8/356 |
| 9,853,436 B2 * | 12/2017 | Simon | H02G 7/12 |
| 2003/0213200 A1 | 11/2003 | Hornidge | |
| 2005/0120652 A1 * | 6/2005 | Cacciani | F16L 3/13 |
| | | | 52/302.1 |
| 2005/0126094 A1 * | 6/2005 | Shimizu | F16L 3/26 |
| | | | 52/220.1 |
| 2006/0054336 A1 * | 3/2006 | McNutt | H02G 3/045 |
| | | | 174/50 |
| 2006/0059802 A1 * | 3/2006 | McNutt | H02G 3/045 |
| | | | 52/220.7 |
| 2009/0065249 A1 * | 3/2009 | Silvers | H02G 3/30 |
| | | | 174/72 A |
| 2010/0101855 A1 * | 4/2010 | Handler | H02G 3/0431 |
| | | | 174/505 |
| 2010/0122836 A1 * | 5/2010 | Pollard, Jr. | H02G 3/24 |
| | | | 174/155 |
| 2010/0139948 A1 * | 6/2010 | Smallhorn | H02G 3/32 |
| | | | 174/135 |
| 2010/0200707 A1 * | 8/2010 | Garza | H02G 3/0456 |
| | | | 248/68.1 |
| 2012/0111598 A1 * | 5/2012 | Pawluk | H02G 3/0437 |
| | | | 174/68.3 |
| 2014/0175231 A1 * | 6/2014 | Cox | F16L 3/222 |
| | | | 248/68.1 |
| 2016/0060877 A1 | 3/2016 | Witschi | |

OTHER PUBLICATIONS

Old World Traditions, "Faux Wood Beams," http://owtraditions.com/product-category/faux-beams, at least as early as Sep. 27, 2017, 5 pages.

Faux Wood Beams, "Faux Wood Ceiling Beams, Faux Wood Gives You the Look for Less," www.fauxwoodbeams.com/fauxbeams.php, at least as early as Sep. 28, 2017, 3 pages.

Real Wood Beams, "Real Wood Beams for Sale, Rustic Charm of Vintage Barns," www.fauxwoodbeams.com/real-wood-beams.php, at least as early as Sep. 29, 2017, 2 pages.

Video Tutorial With Transcript, "Installing Faux Ceiling Beams," www.fauxbeams.com/video-install.php, at least as early as Sep. 29, 2017, 2 pages.

Houzz, "Recessed 5-Light Wood Beam, Rustic, Kitchen Island Lighting by West Ninth Vintage," www.houzz.com/product, at least as early as Mar. 25, 2018, 1 page.

Montana Timber Products, "Welcome to a New Era of Building Materials," www.montanatimberproducts.com, at least as early as Sep. 28, 2017, 2 pages.

Woodland Custom Beam Company, "Woodland Custom Beam Company Ships Custom Beams and Mantles Nationwide," www.woodlandbeam.com, at least as early as Sep. 28, 2017, 5 pages.

\* cited by examiner

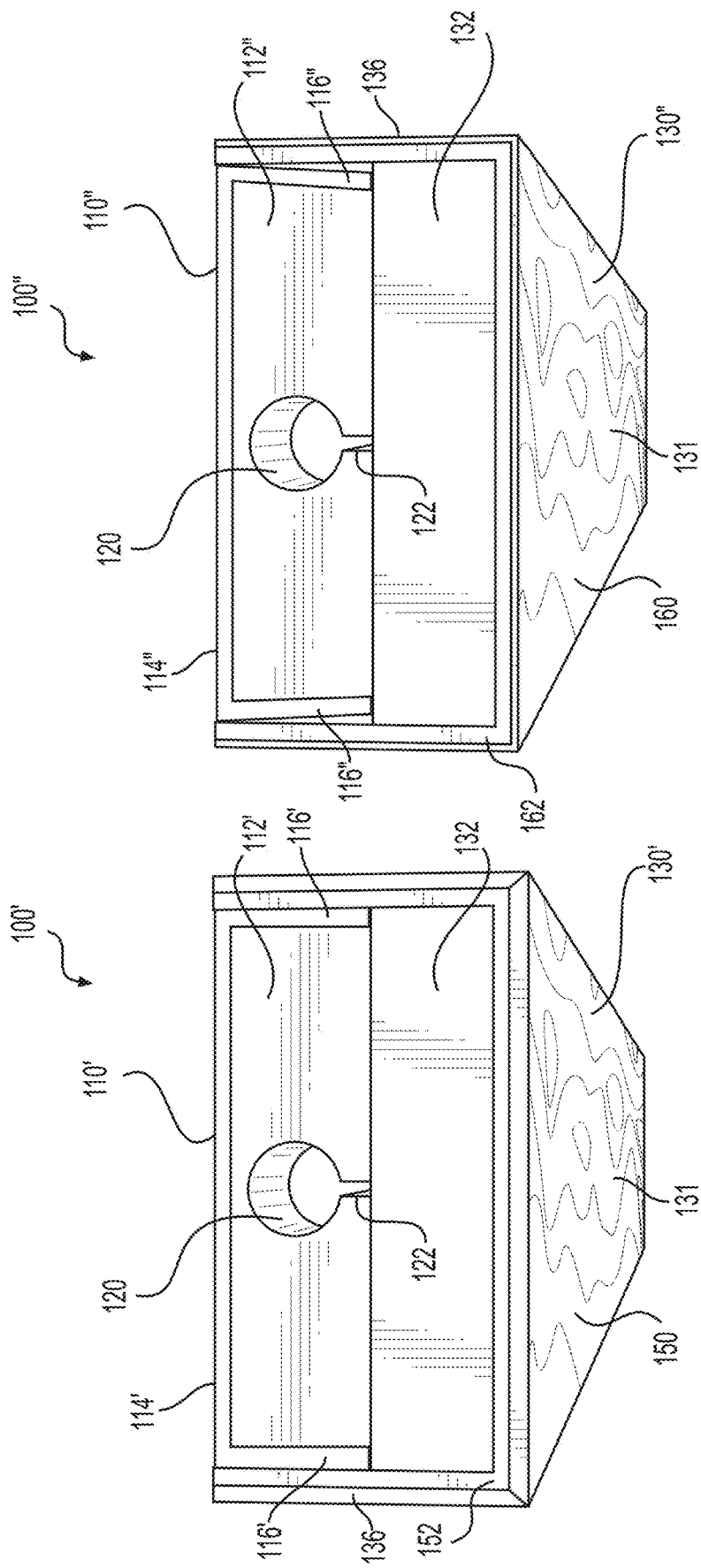

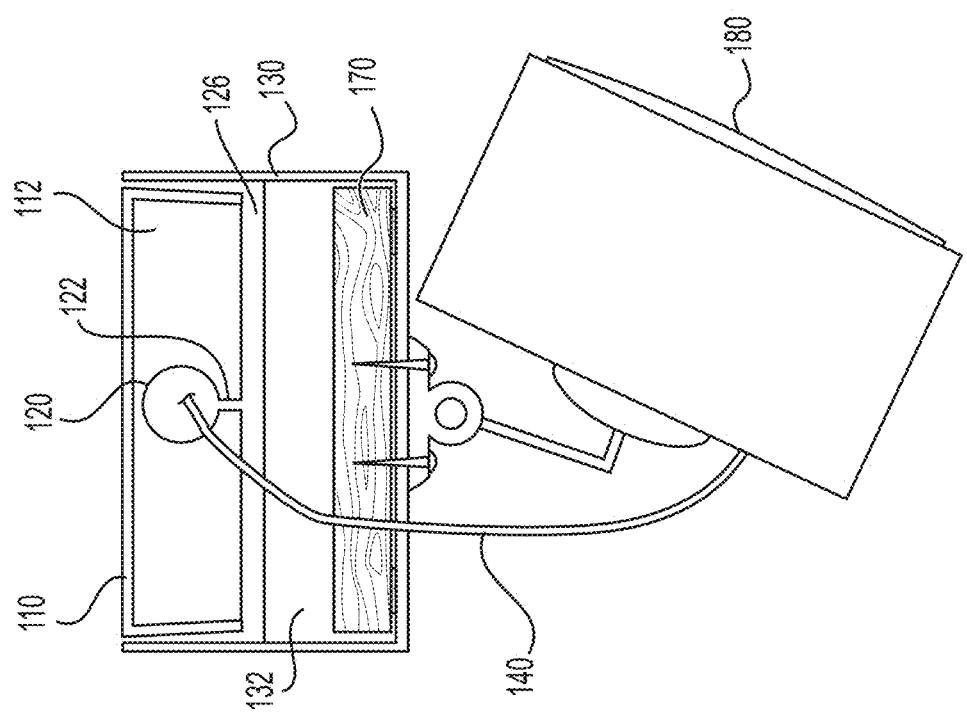

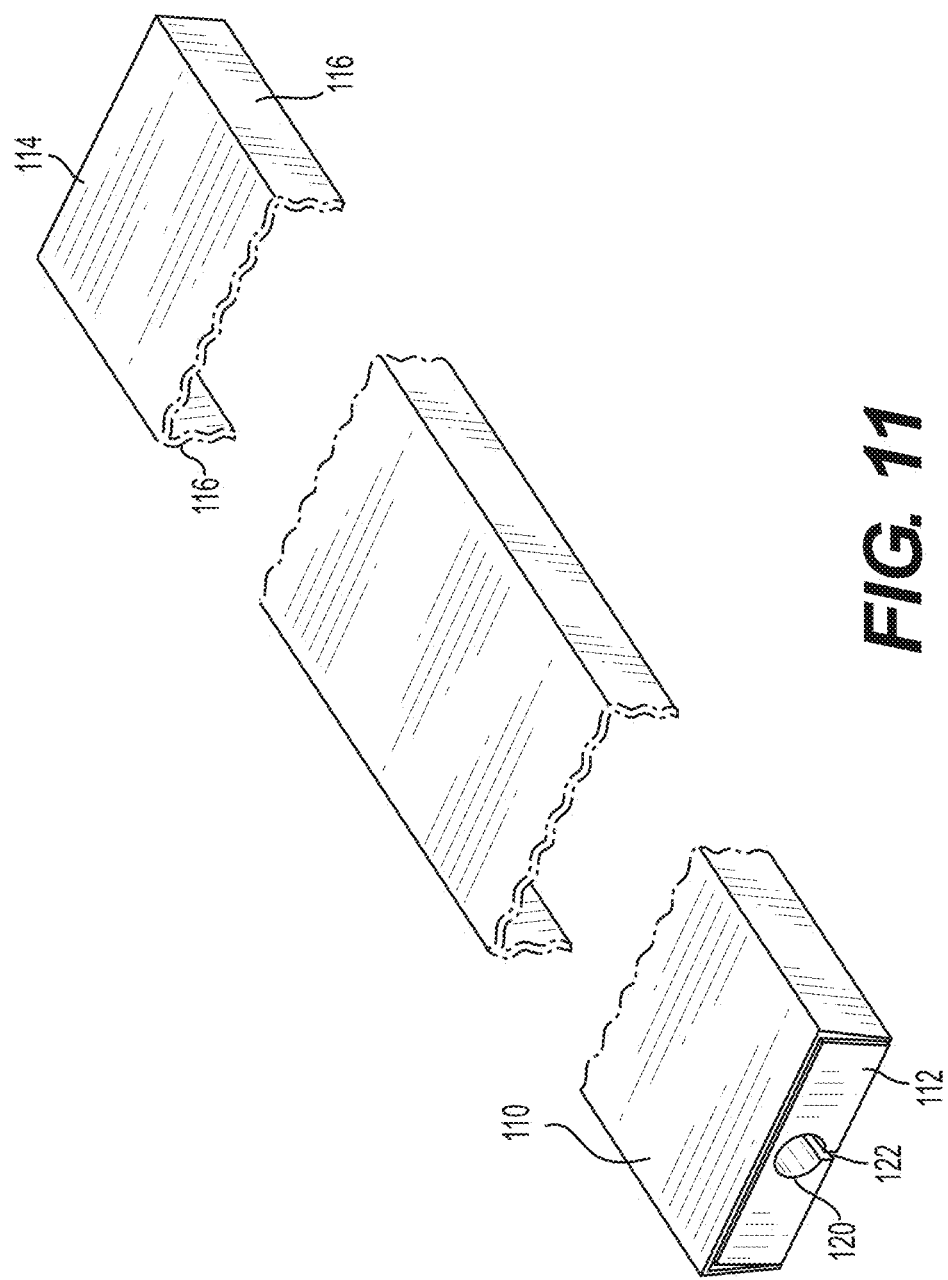

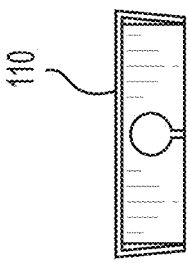
FIG. 13
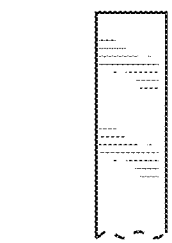
FIG. 14
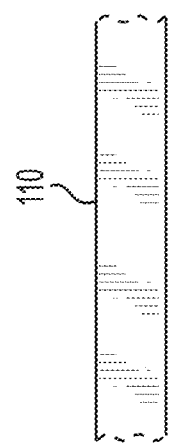
FIG. 15
FIG. 16

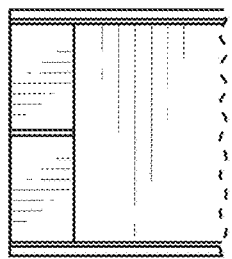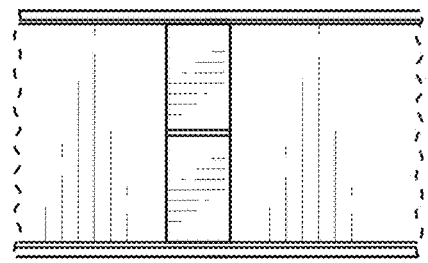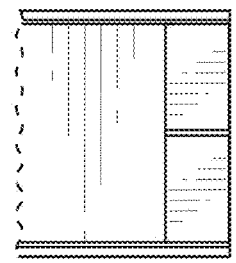
FIG. 18
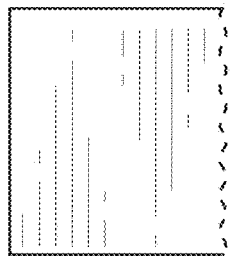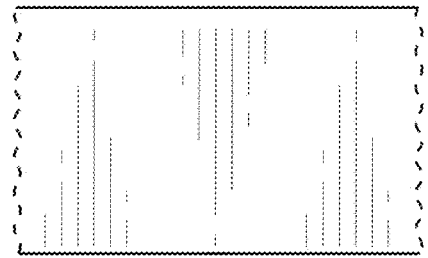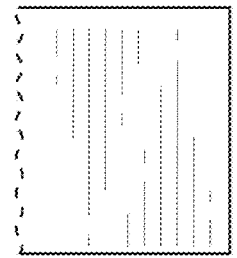
FIG. 17

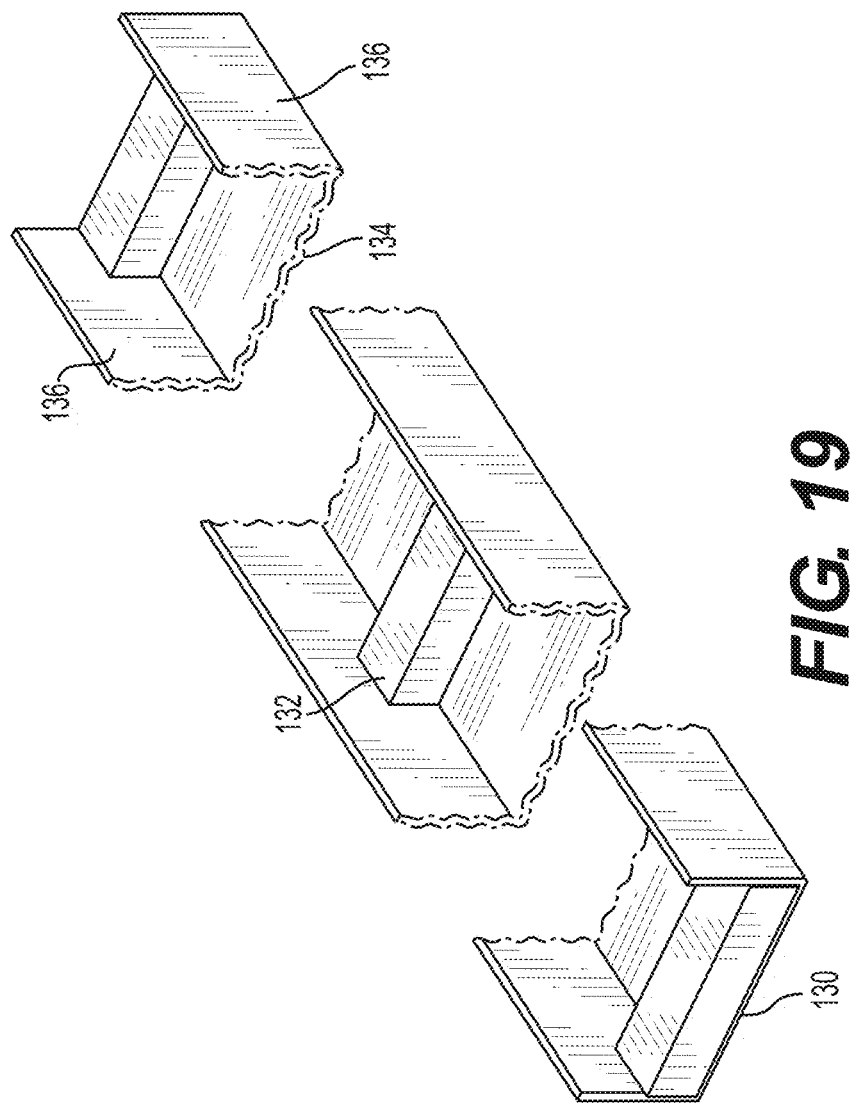

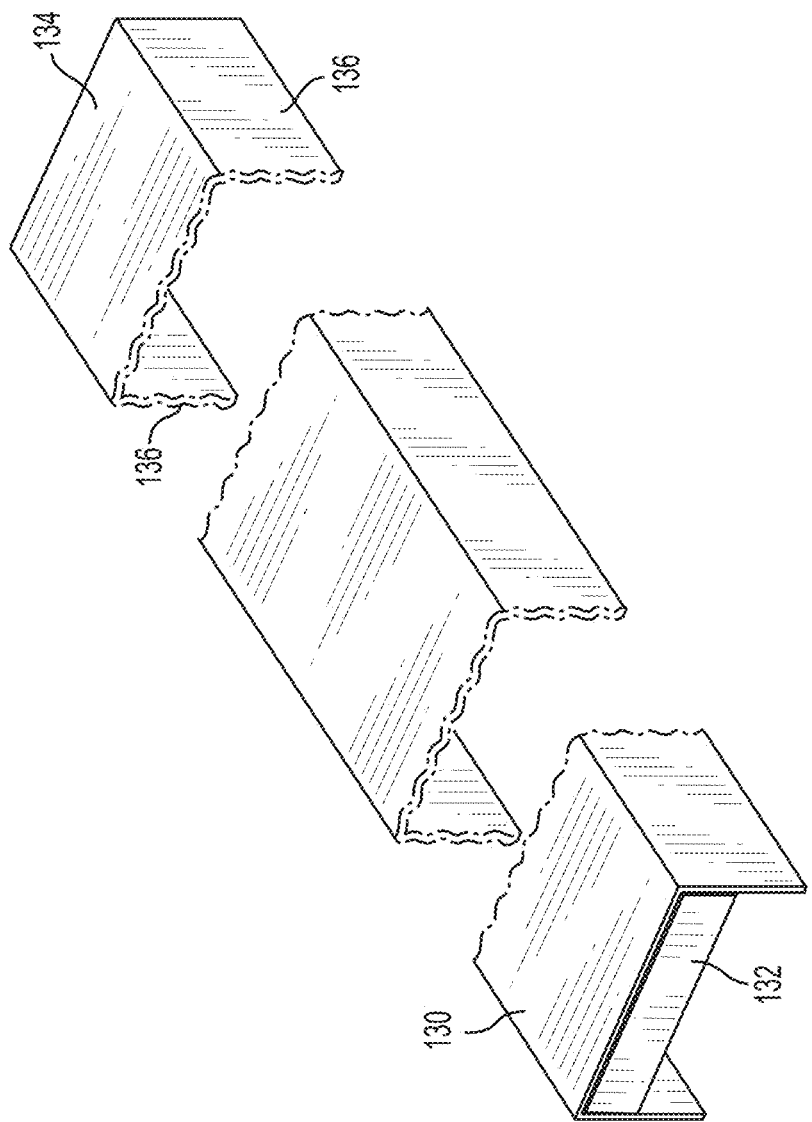

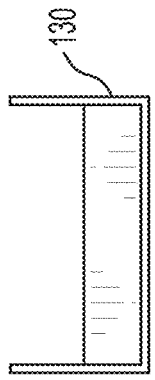
*FIG. 22*
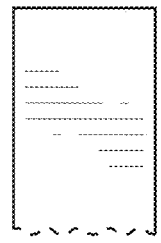
*FIG. 23*
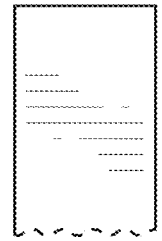
*FIG. 24*
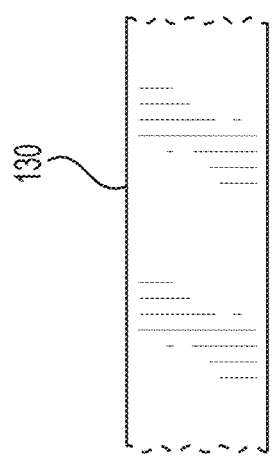
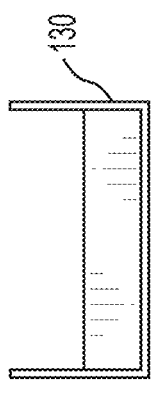
*FIG. 21*
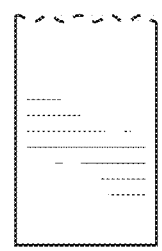
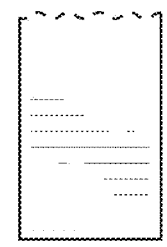

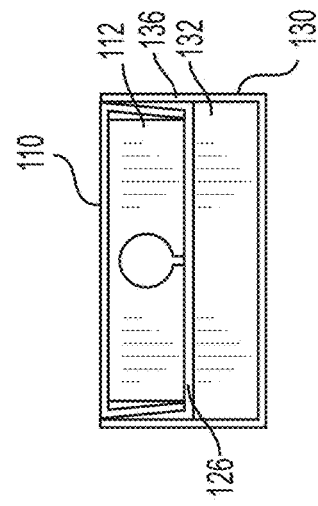
FIG. 29
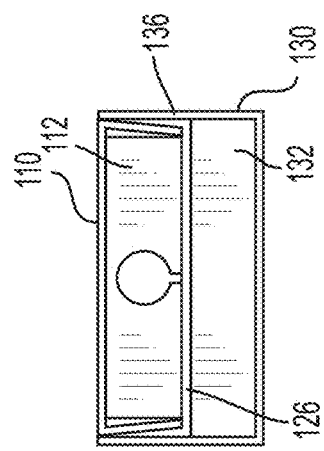
FIG. 30
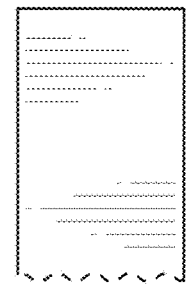
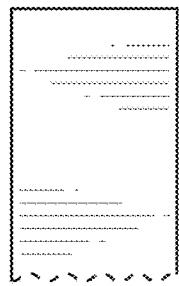
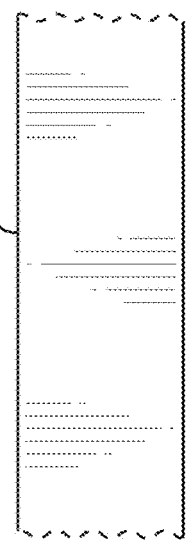
FIG. 31
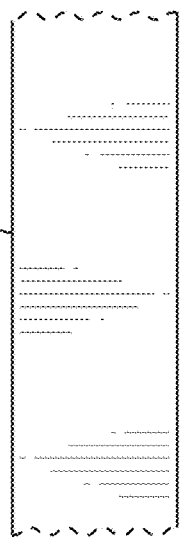
FIG. 32

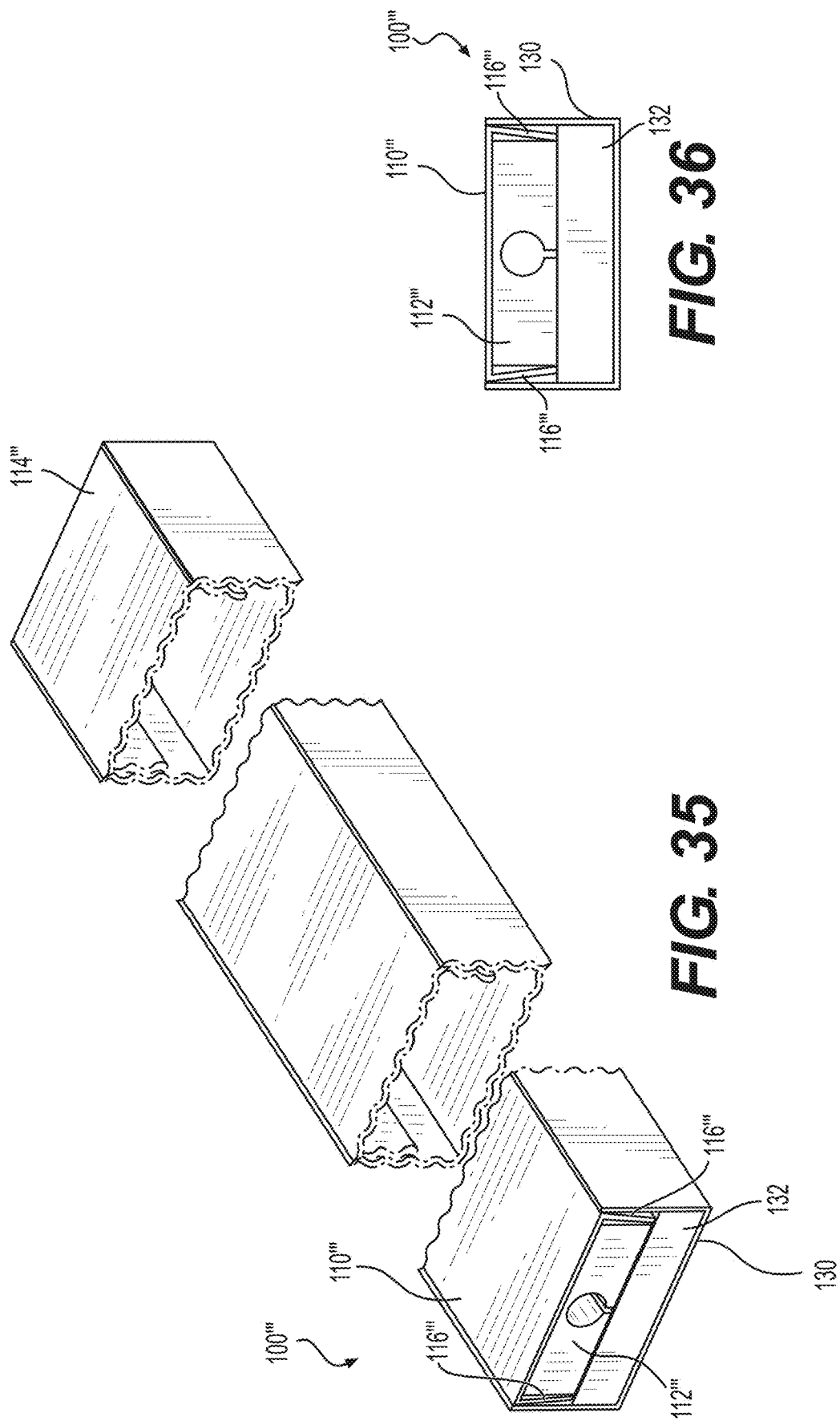

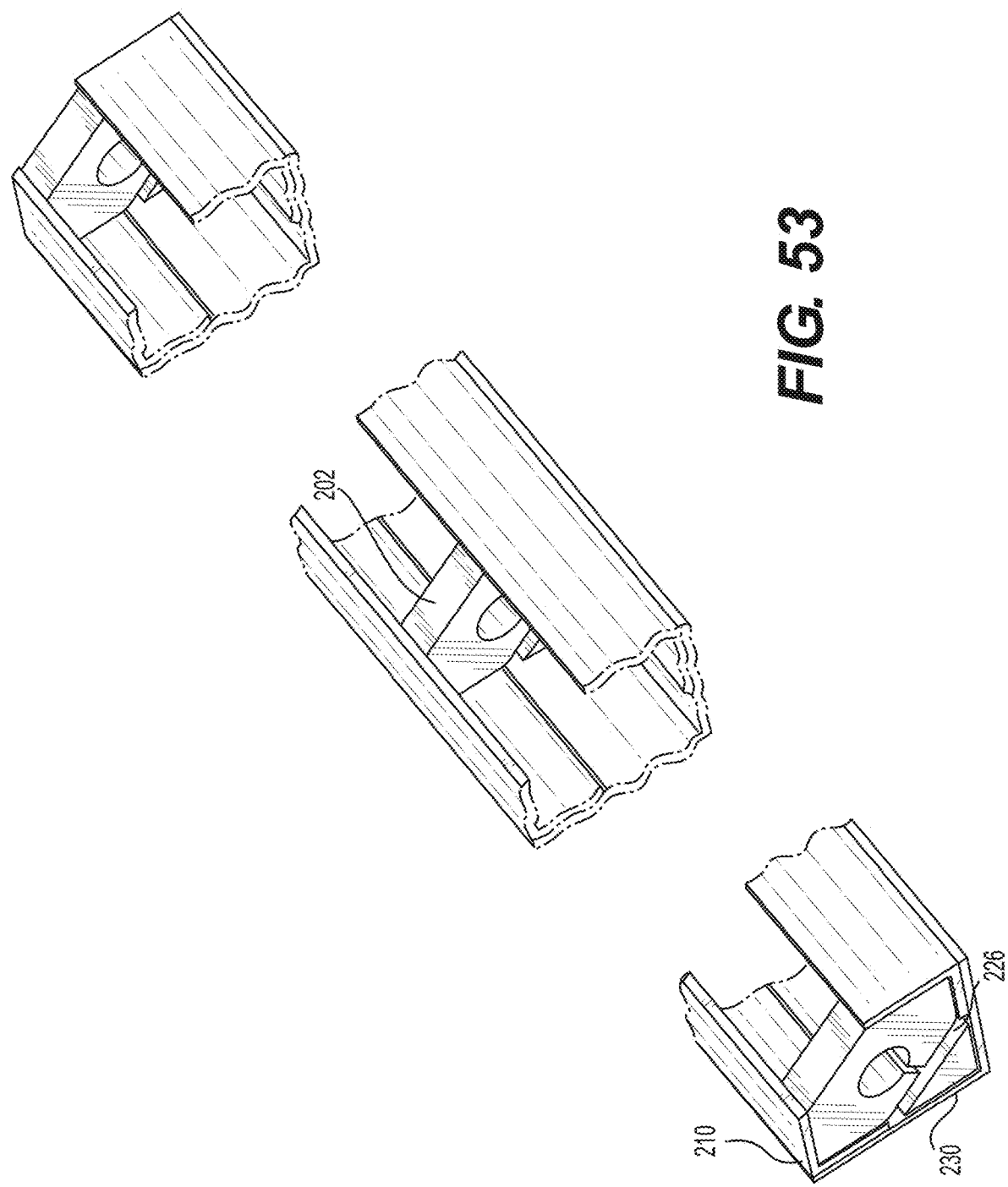

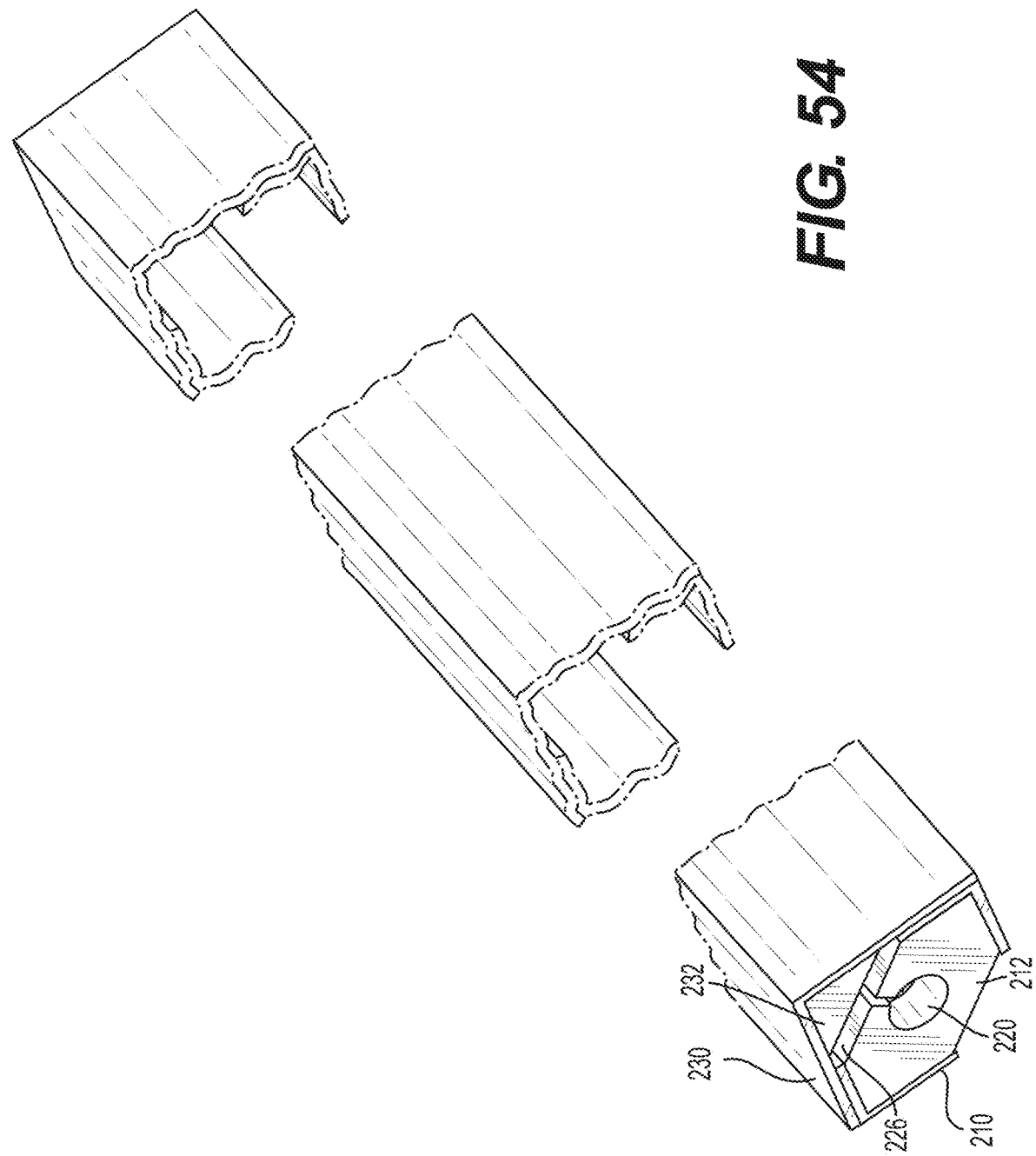

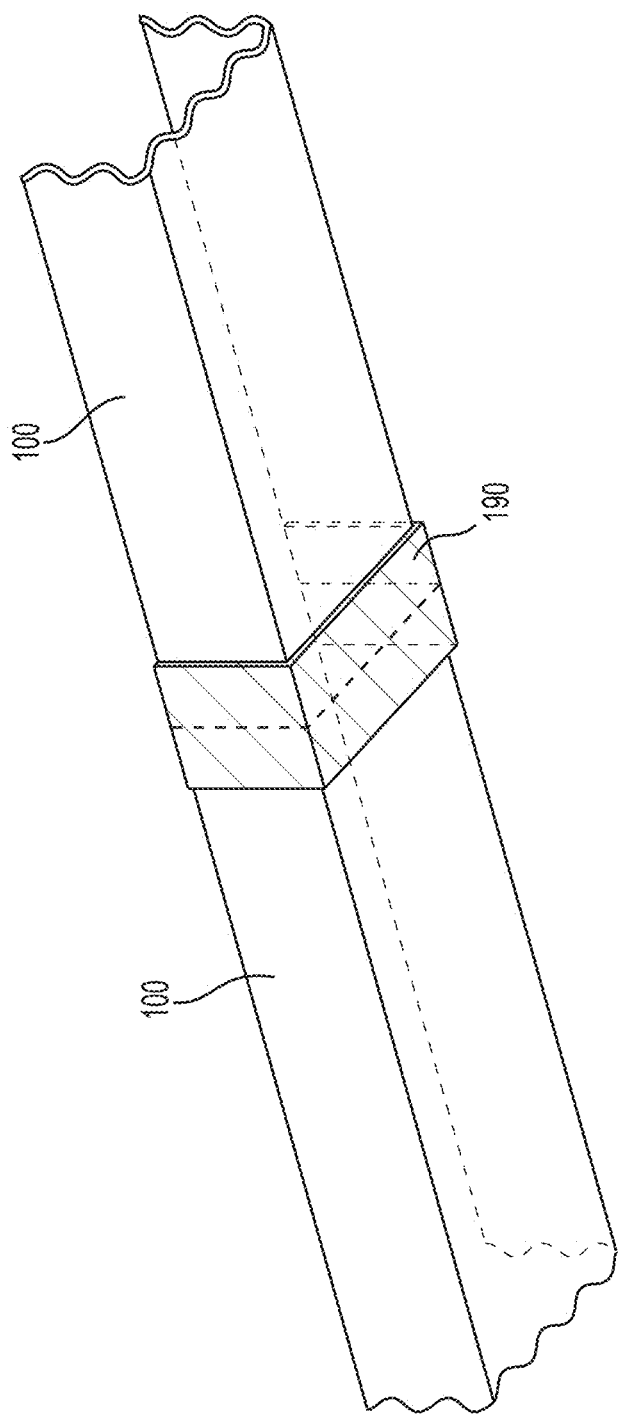

LIGHTWEIGHT ORNAMENTAL BEAMS

BACKGROUND OF THE INVENTION

Described herein are ornamental beams and, more specifically, both flat and corner lightweight ornamental beams having a sleeper (hidden support) and a cover, the preferred ornamental beams having a wire and cable raceway therethrough.

Timber-frame construction (also referred to as "post-and-beam construction") historically includes functional or structural overhead or ceiling beams (referred to generally as "structural beams") that are part of a building's weight-bearing design. Historically, overhead structural beams might be made from fallen or felled trees that were shaped using an axe. These structural beams were generally very heavy with a ten-foot beam generally weighing between 30 and 50 pounds. Structural beams effectively supported the weight of upper floors and roofs. Exposed beam construction using structural beams can be found in cottages and castles throughout the world including, but not limited to, Europe, the Orient, the Middle East, and the United States. With the availability of cheaper mass produced smaller dimensional lumber, frame rafters (the sloped members) and joists (the horizontal ceiling members) began to replace the expensive and hard to obtain overhead structural beams in home construction. In the second half of the twentieth century, "dropped" ceilings were even used to conceal the overhead structural beams. Installation of structural beams is extremely complicated and requires professionals (often requiring engineers and inspectors).

Although the earliest purpose of overhead beams was purely functional, overhead beams have an undeniable aesthetic appeal. Recognizing that overhead beams can add drama and appeal to any architectural style (including a rustic style), decorative overhead beams (also referred to as "decorative beams" or "faux beams") have become very popular. Decorative beams do not bear a load and are intended solely for aesthetic appeal. Decorative beams can be (and often are) installed after the ceiling is finished. If properly installed, it is difficult to determine whether a decorative beam is solid or hollow.

One type of decorative overhead beam is installed using a ledger board and box design (referred to generally as a "box beam"). The ledger board may be dimensional lumber (e.g. 2"×4" boards) positioned along the ceiling. Because of the weight of the box beams, the ledger board should be attached to joists. Then three-sided wood rectangular "boxes" are installed so as to cover the ledger board and create the appearance of a solid beam. Because beams using the ledger board and box design would be hollow, they would be lighter than similarly dimensioned solid versions, but they would still be relatively heavy. Depending on the length of the ceiling beam, the weight of the wood used for the box cover, and the number of beams, these decorative beams can add a thousand pounds or more to a building's structure. For this reason, it is wise to have an engineer assess the existing structure before installation of the decorative beams and to have a professional perform the installation.

Modern decorative beams can also be made (e.g. prefabricated) from lightweight materials such as fiberglass, high-density polyurethane, urethane foam, and plastic. A ten-foot beam made from these lighter materials would generally weigh between 10 pounds and 20 pounds. These lightweight material decorative beams are finished to have the outward appearance mimicking solid wood beams. Installation typically involves mounting a plurality of anchor blocks to the ceiling and then fitting the decorative beams over the anchor blocks. Although ideally the mounting blocks should be attached to joists, it is possible to attach them to the sheetrock using toggle bolts. Screws may be used to attach these decorative beams to the anchor blocks. Because the lightweight materials reduce the weight of these decorative beams, these beams may be installed without an engineer's approval (although, again, depending on the weight, it may be prudent to use professionals). Although these beams are lightweight, installation usually requires multiple people. These lightweight material decorative beams are popular because they are usually less expensive and easier to install than the ledger board and box design decorative beams.

U.S. Pat. No. 4,718,213 to Butterfield (the "Butterfield reference") is directed to a decorative beam assembly. The Butterfield reference describes a decorative beam assembly comprising a beam support bracket which is attached to a ceiling or wall and a hollow plastic channel shaped decorative beam, which snap-fittingly engages the bracket by means of inwardly extending arms on the beam contacting flange surfaces on the bracket.

U.S. Patent Application No. 2003/0213200 to Hornidge (the "Hornidge reference") is directed to an apparatus for building a faux wood ceiling that includes wooden beams and interlocking planks or panels. Each of the beams is attachable to a wall or ceiling. Each of the wooden beams is a hollow wooden beam, which can be finished to appear as an older wooden beam. Once installed, access to wiring and plumbing is available by removing any of the wooden panels by simply pressing upwards.

Cable raceways (or raceways or raceway systems) include enclosed conduits that form a physical pathway for cables and/or wiring (e.g. electrical wiring). Raceways protect wires and cables from heat, humidity, corrosion, water intrusion and general physical threats.

BRIEF SUMMARY OF THE INVENTION

Described herein are ornamental beams and, more specifically, both flat and corner lightweight ornamental beams having a sleeper and a cover, the preferred ornamental beams having a wire and cable raceway therethrough.

Described herein is an ornamental beam including at least one sleeper and at least one cover. The each at least one sleeper preferably has a plurality of sleeper support ribs. Each sleeper support rib preferably has at least one bore therein. Each at least one cover preferably has a plurality of cover support ribs. When the ornamental beam is assembled with the at least one cover covering the at least one sleeper, each cover support rib is positioned to be substantially coextensive with a respective corresponding sleeper support rib.

For at least one preferred ornamental beam, the bores in the plurality of sleeper support ribs form a raceway for cables or wires.

For at least one preferred ornamental beam, each at least one bore of each sleeper support rib preferably has an access path that extends from an unobstructed edge of the sleeper support rib through to the bore.

For at least one preferred ornamental beam, the ornamental beam is a flat ornamental beam. A preferred flat ornamental beam preferably includes a flat sleeper and a flat cover. A flat sleeper preferably includes (i) an elongate back that preferably has elongate edges; (ii) elongate sides, each elongate edge of the elongate back flanked by one of the elongate sides; and (iii) the plurality of sleeper support ribs positioned at intervals along the length of the flat sleeper. A flat cover preferably includes (i) an elongate back that preferably has elongate edges; (ii) elongate sides, each elongate edge of the elongate back flanked by one of the elongate sides; and (iii) the plurality of cover support ribs positioned at intervals along the length of the flat cover.

For at least one preferred ornamental beam, the ornamental beam is a corner ornamental beam. A preferred corner ornamental beam preferably includes a corner sleeper and a corner cover. The corner sleeper preferably includes (i) a first V-shaped elongate side; (ii) a second V-shaped elongate side; and (iii) the plurality of sleeper support ribs positioned at intervals along the length of the corner sleeper. A corner cover preferably includes a first elongate side; (ii) a second elongate side; and (iii) the plurality of cover support ribs positioned at intervals along the length of the corner cover.

Also described herein is a method for installing an ornamental beam. The first step in the method is providing an ornamental beam preferably includes (i) at least one sleeper, each sleeper preferably has a plurality of sleeper support ribs, each sleeper support rib preferably has at least one bore therein; and (ii) at least one cover, each cover preferably has a plurality of cover support ribs. The next step is attaching the at least one sleeper to a flat surface. Then inserting wires may be inserted through the at least one bore of a plurality of the plurality of sleeper support ribs. (Technically, the wires could be inserted prior to the step of attaching the sleeper.) Then, the at least one cover is secured to cover a respective the at least one sleeper. When the ornamental beam is assembled with the at least one cover covers the at least one sleeper, and each cover support rib is positioned to be substantially coextensive with a respective corresponding sleeper support rib.

The step of attaching the at least one sleeper to a flat surface may include using sleeper connectors used to attach the at least one sleeper to a flat surface. The step of inserting wires further may include inserting wires through an access path that extends from an unobstructed edge of the sleeper support rib through to the bore. The step of securing the at least one cover to cover a respective the at least one sleeper may include using cover connectors to secure the at least one cover to cover a respective the at least one sleeper.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

BRIEF DESCRIPTION OF THE SEVERAL VIEWS OF THE DRAWINGS

The accompanying drawings illustrate various exemplary ornamental beams and/or provide teachings by which the various exemplary ornamental beams are more readily understood.

FIG. 8 is a perspective end view of a first alternative exemplary flat ornamental beam (including both a flat sleeper and flat cover), there being no gap between the sleeper support rib and the cover support rib, the sleeper support rib being a wider rectangular sleeper support rib, the longitudinal sides of the flat sleeper being flush with the sides of the sleeper support rib and the sides of the flat cover, and thin sheets of ornamental material (e.g. wood) being attached to the outer surfaces of the core of the flat cover.

FIG. 9 is a perspective end view of a second alternative exemplary flat ornamental beam (including both a flat sleeper and flat cover), there being no gap between the sleeper support rib and the cover support rib, the sleeper support rib being shaped so that the sides of the sleeper support rib are flush with the inwardly angled longitudinal sides of the flat sleeper, and a thin sheet of ornamental material (e.g. a coating or a sticker having an ornamental design) being adhered to the outer surfaces of the core of the flat cover.

FIG. 10 is an end view of an exemplary flat ornamental beam (including both a flat sleeper and flat cover) with a mounting block positioned between two adjacent support ribs, and a speaker suspended from the mounting block.

FIG. 11 is a top perspective view of a flat sleeper.

FIG. 13 is a first end view of the flat sleeper of FIG. 11.

FIG. 14 is a second end view of the flat sleeper of FIG. 11.

FIG. 15 is a first side view of the flat sleeper of FIG. 11.

FIG. 16 is a second side view of the flat sleeper of FIG. 11.

FIG. 17 is a top view of the flat sleeper of FIG. 11.

FIG. 18 is a bottom view of the flat sleeper of FIG. 11.

FIG. 19 is a top perspective view of a flat cover.

FIG. 20 is a bottom perspective view of the flat cover of FIG. 19.

FIG. 21 is a first end view of the flat cover of FIG. 19.

FIG. 22 is a second end view of the flat cover of FIG. 19.

FIG. 23 is a first side view of the flat cover of FIG. 19.

FIG. 24 is a second side view of the flat cover of FIG. 19.

FIG. 29 is a first end view of the flat ornamental beam of FIG. 27.

FIG. 30 is a second end view of the flat ornamental beam of FIG. 27.

FIG. 31 is a first side view of the flat ornamental beam of FIG. 27.

FIG. 32 is a second side view of the flat ornamental beam of FIG. 27.

FIG. 35 is a top perspective view of a flat ornamental beam including a flat sleeper and a flat cover similar to the flat ornamental beam of FIG. 27, but with no gap between the flat sleeper support rib and the flat cover support rib.

FIG. 36 is an end view of the flat ornamental beam of FIG. 35.

FIG. 53 is a top perspective view of a corner ornamental beam including a corner sleeper and a corner cover.

FIG. 54 is a bottom perspective view of the corner ornamental beam of FIG. 53.

FIG. 63 is a perspective view showing an exemplary bracket used to cover the ends of two adjacent ornamental beams.

Figure 1:
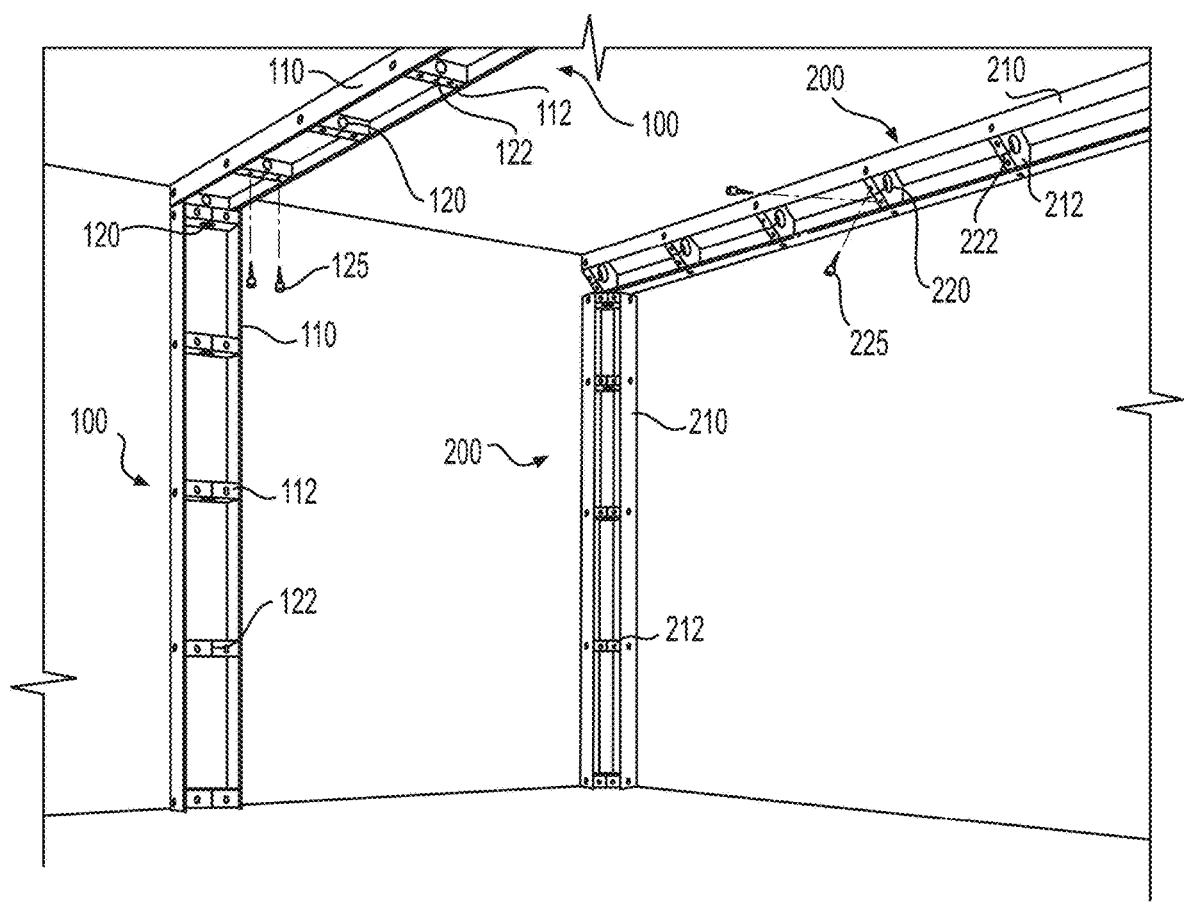
FIG. 1 is a perspective view showing sleepers installed along flat surfaces (both the wall and the ceiling) and along corner surfaces (both the wall and the ceiling) which is a preferred early step in the installation of flat ornamental beams and corner ornamental beams described herein.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Figure 2:
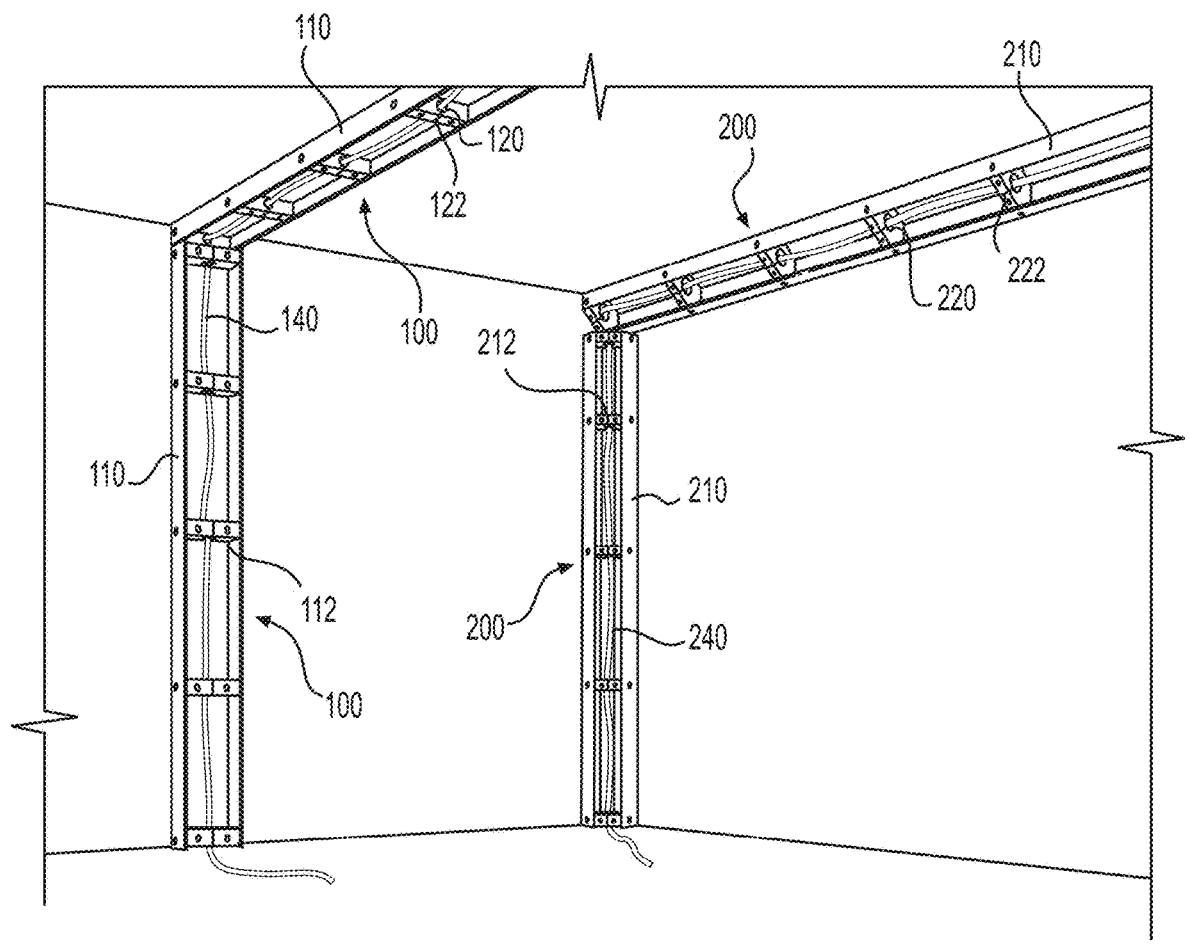
FIG. 2 is a perspective view showing wires installed through the bores in support ribs of the sleepers (both the flat sleepers and the corner sleepers) which is a preferred middle step in the installation of flat ornamental beams and corner ornamental beams described herein.
Figure 3:
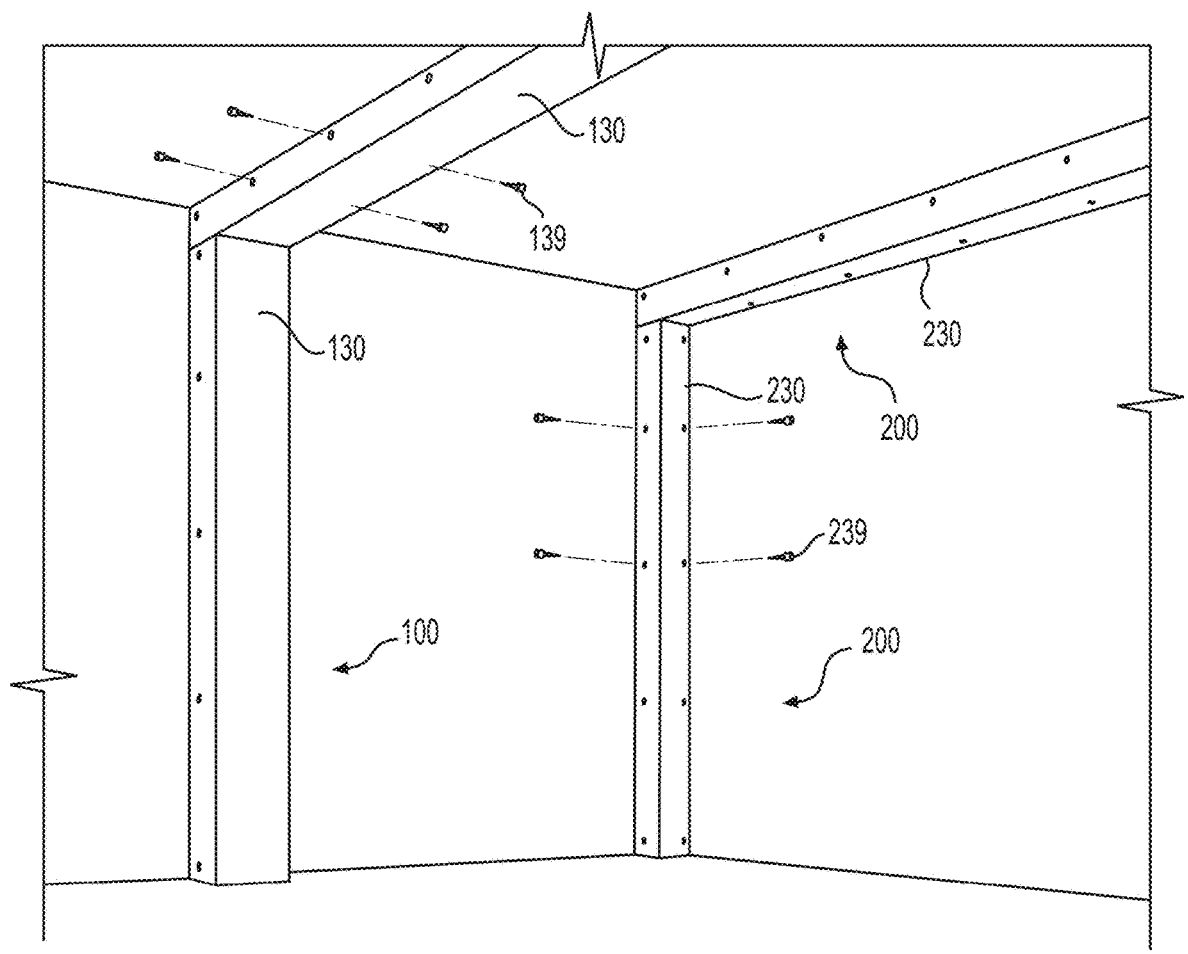
FIG. 3 is a perspective view showing covers (both the flat covers and the corner covers) being secured to the sleepers (both the flat sleepers and the corner sleepers) which is a preferred late step in the installation of flat ornamental beams and corner ornamental beams described herein.
Figure 4:
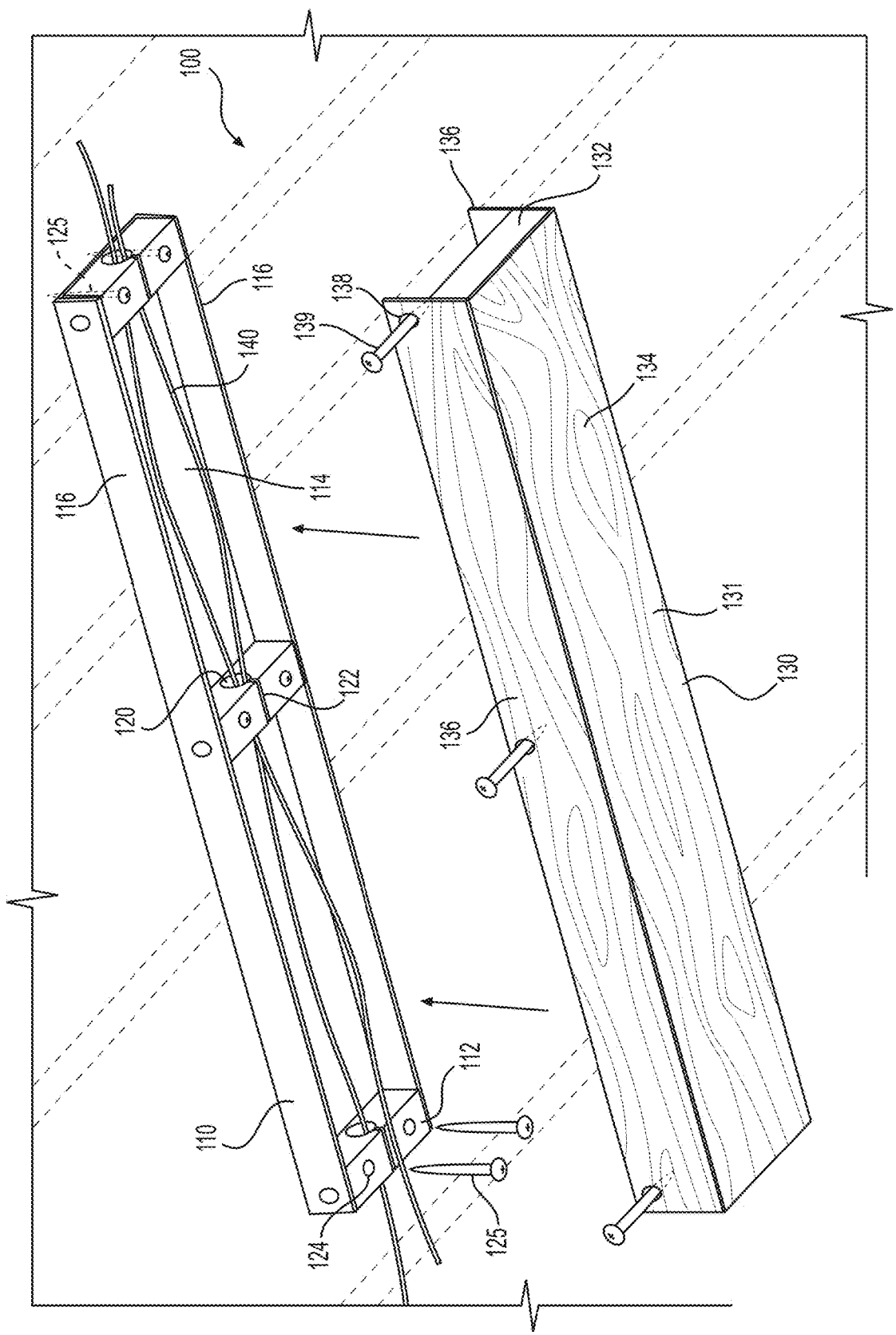
FIG. 4 is an expanded perspective view showing a flat sleeper installed along a flat surface, wires installed through the bores in support ribs of the flat sleeper, and with the flat cover moving toward the flat sleeper to be secured.
Figure 5:
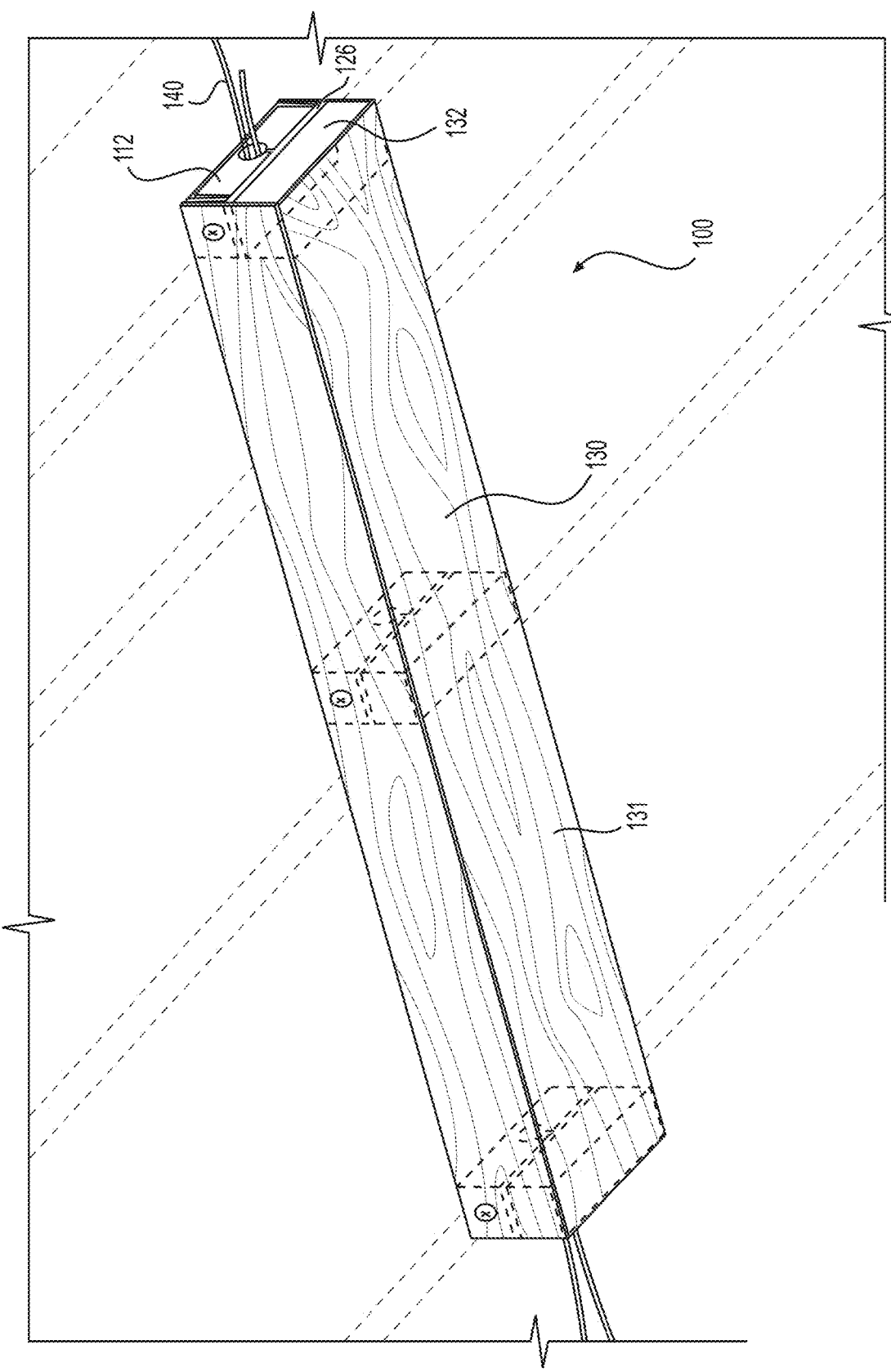
FIG. 5 is a perspective view showing the flat sleeper of FIG. 4 installed along a flat surface, wires installed through the bores in support ribs of the flat sleeper, and the flat cover of FIG. 4 secured to the flat sleeper.
Figure 6:
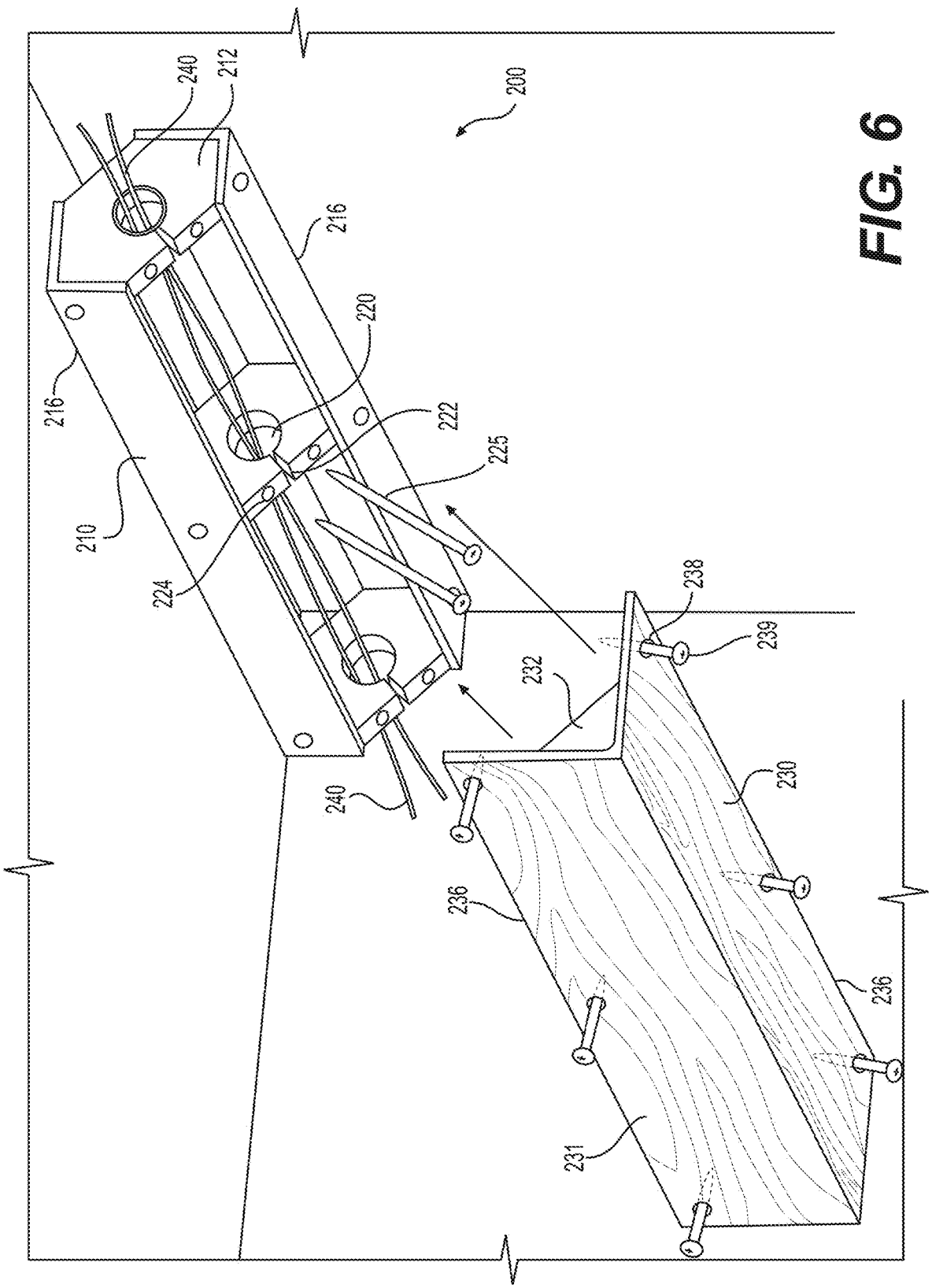
FIG. 6 is an expanded perspective view showing a corner sleeper installed along a corner surface, wires installed through the bores in support ribs of the corner sleeper, and with the corner cover moving toward the corner sleeper to be secured.
Figure 7:
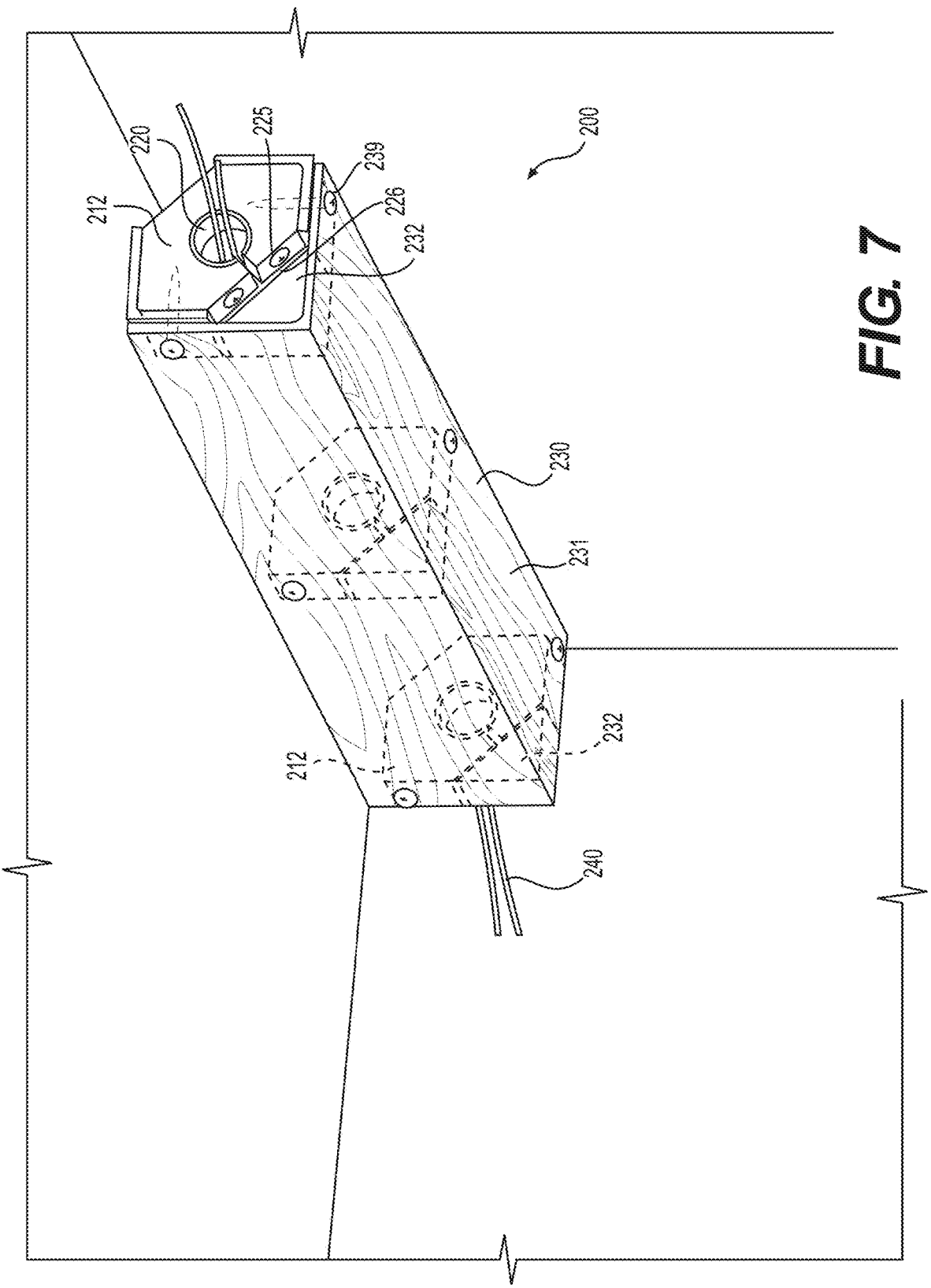
FIG. 7 is a perspective view showing the corner sleeper of FIG. 6 installed along a corner surface, wires installed through the bores in support ribs of the corner sleeper, and the corner cover of FIG. 6 secured to the corner sleeper.
Figure 12:
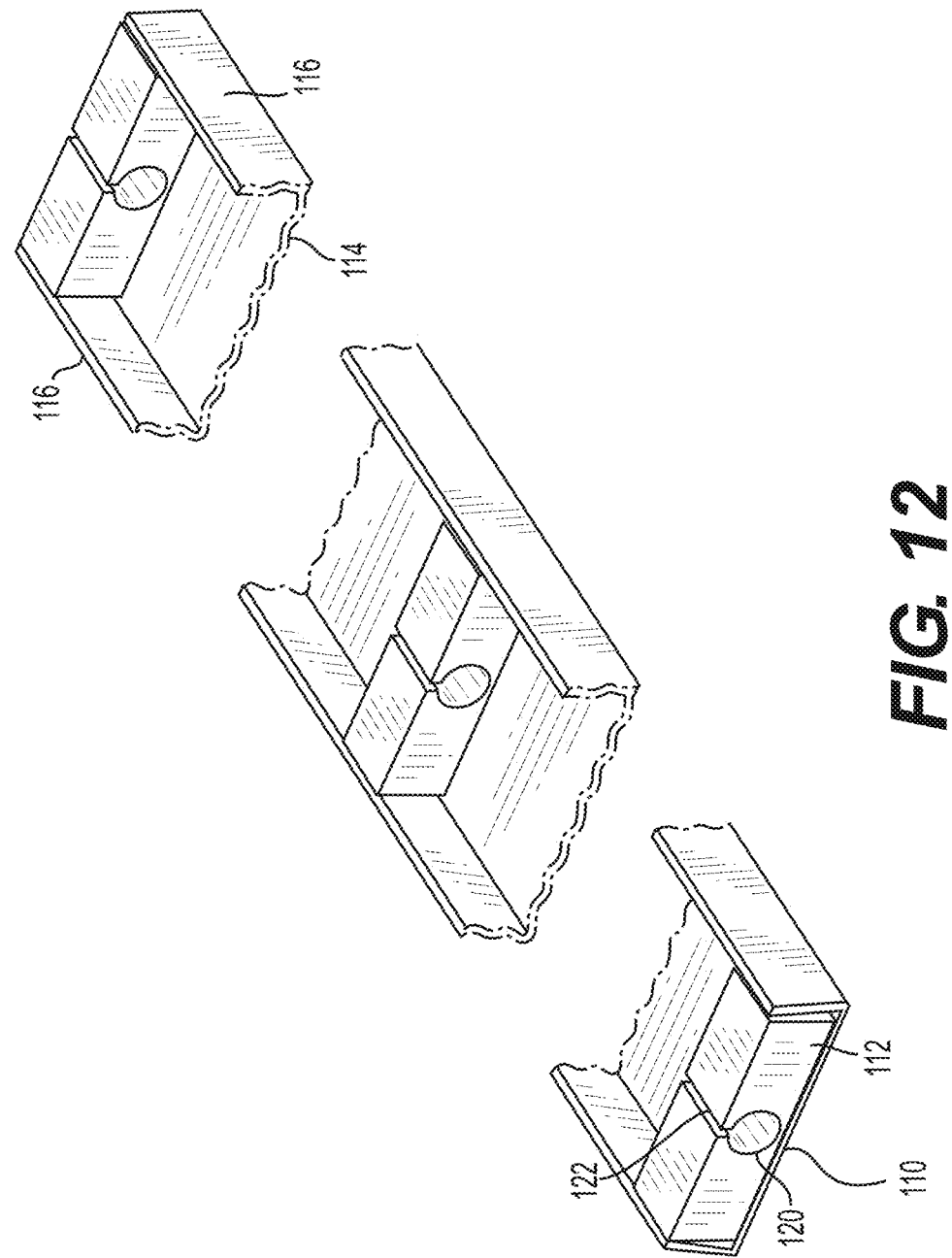
FIG. 12 is a bottom perspective view of the flat sleeper of FIG. 11.
Figure 26:
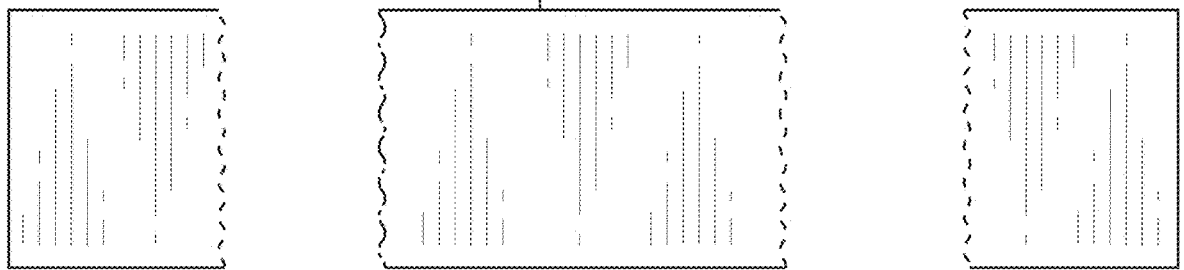
FIG. 26 is a bottom view of the flat cover of FIG. 19.
Figure 25:
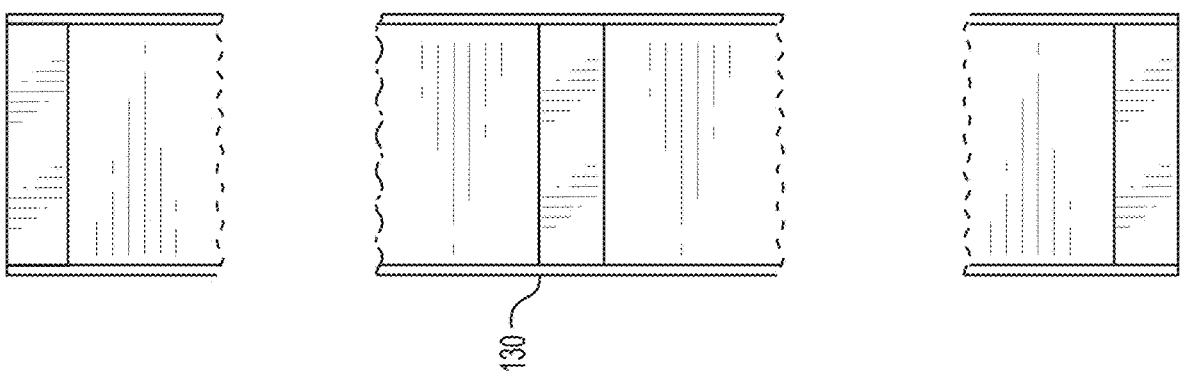
FIG. 25 is a top view of the flat cover of FIG. 19.
Figure 27:
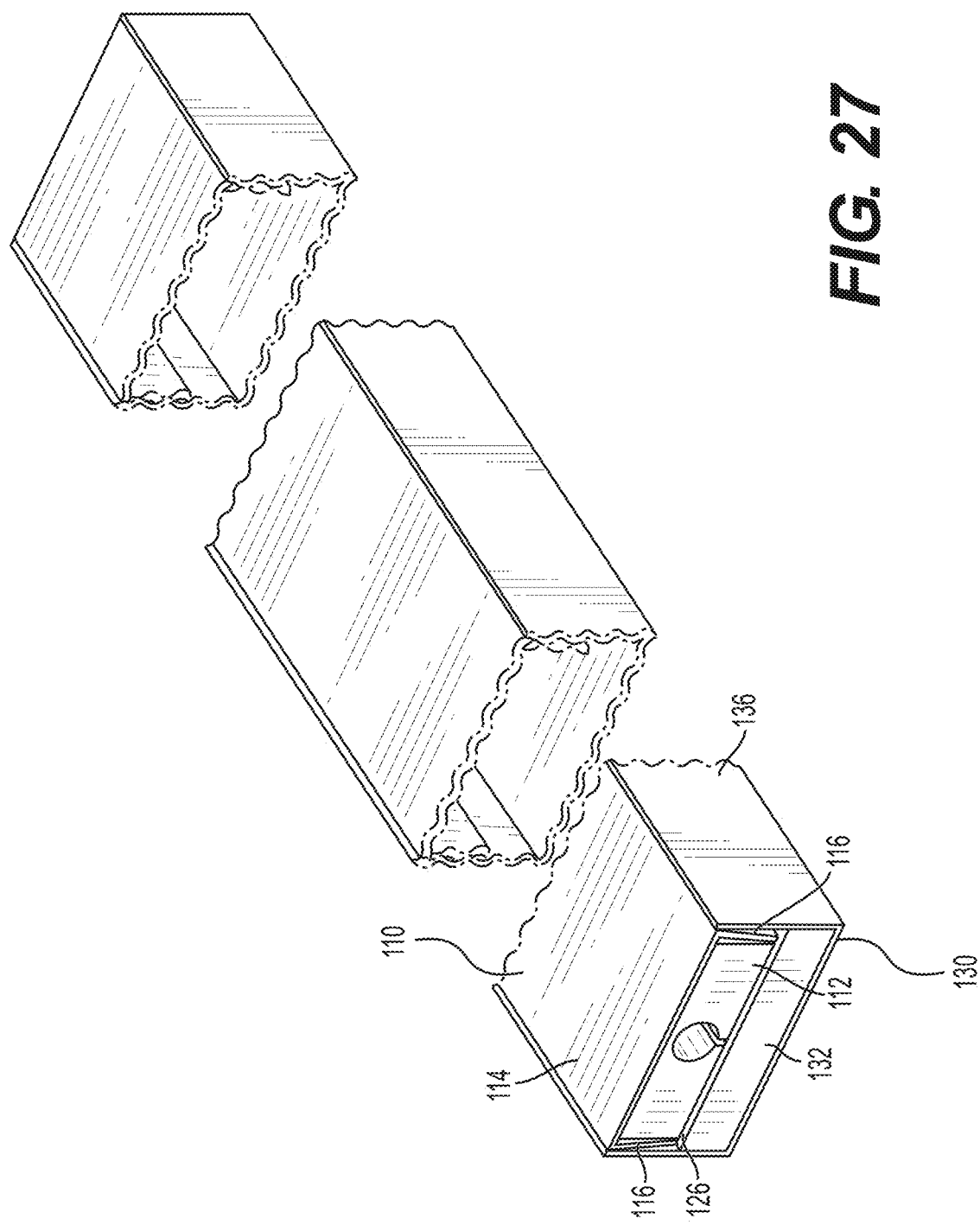
FIG. 27 is a top perspective view of a flat ornamental beam including a flat sleeper and a flat cover.
Figure 28:
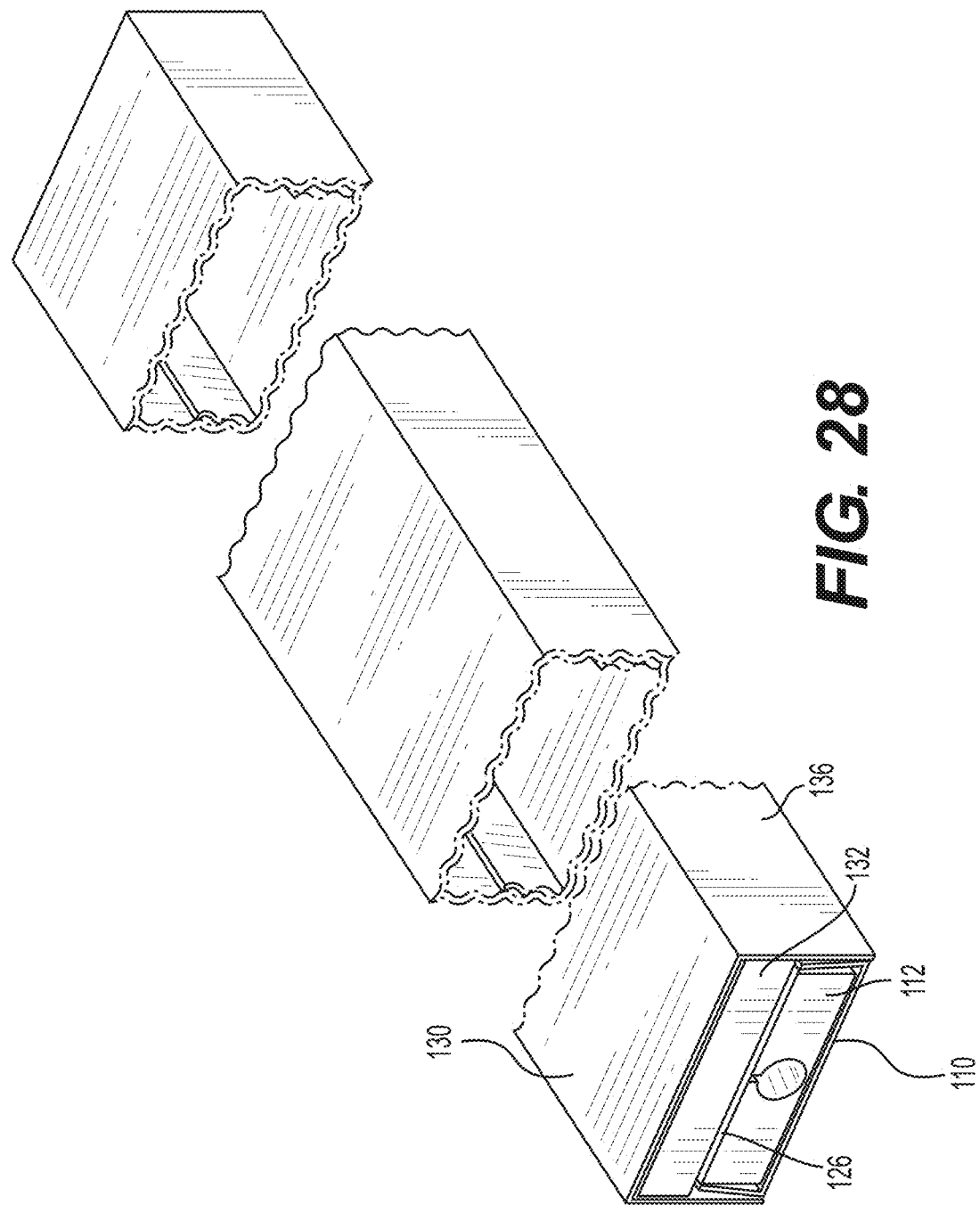
FIG. 28 is a bottom perspective view of the flat ornamental beam of FIG. 27.
Figure 33:
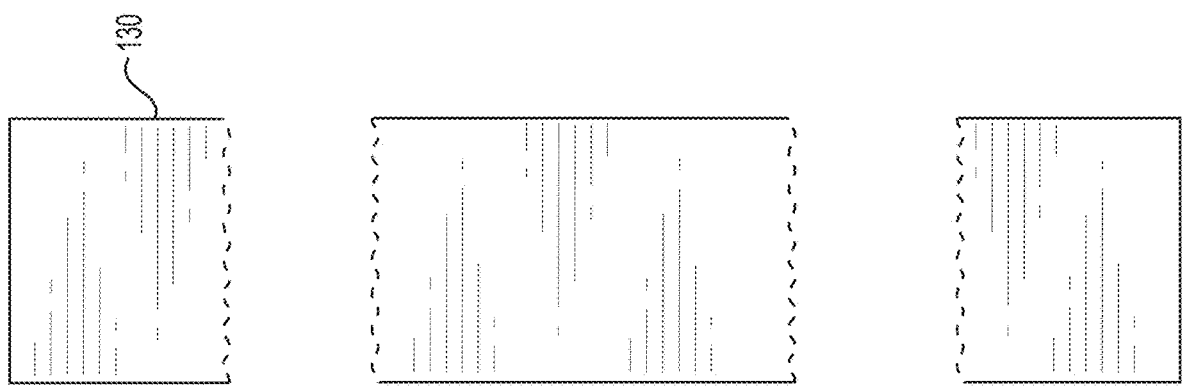
FIG. 33 is a top view of the flat ornamental beam of FIG. 27.
Figure 34:
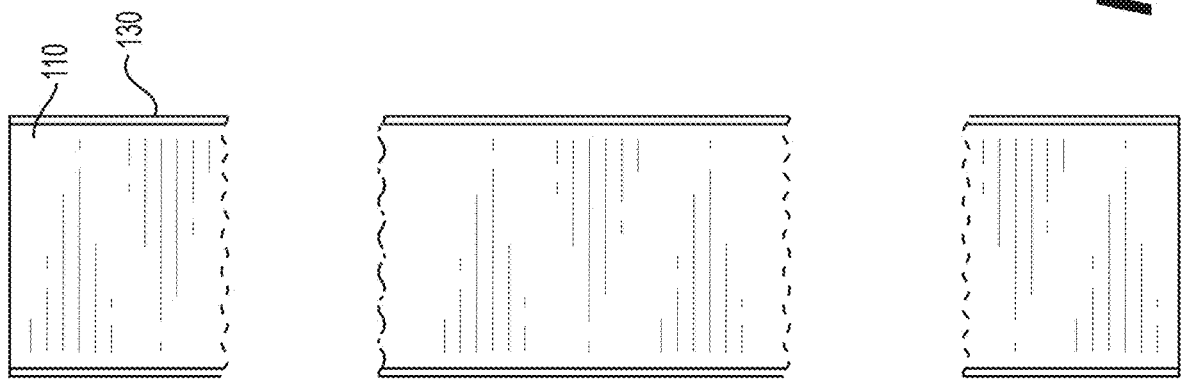
FIG. 34 is a bottom view of the flat ornamental beam of FIG. 27.
Figure 37:
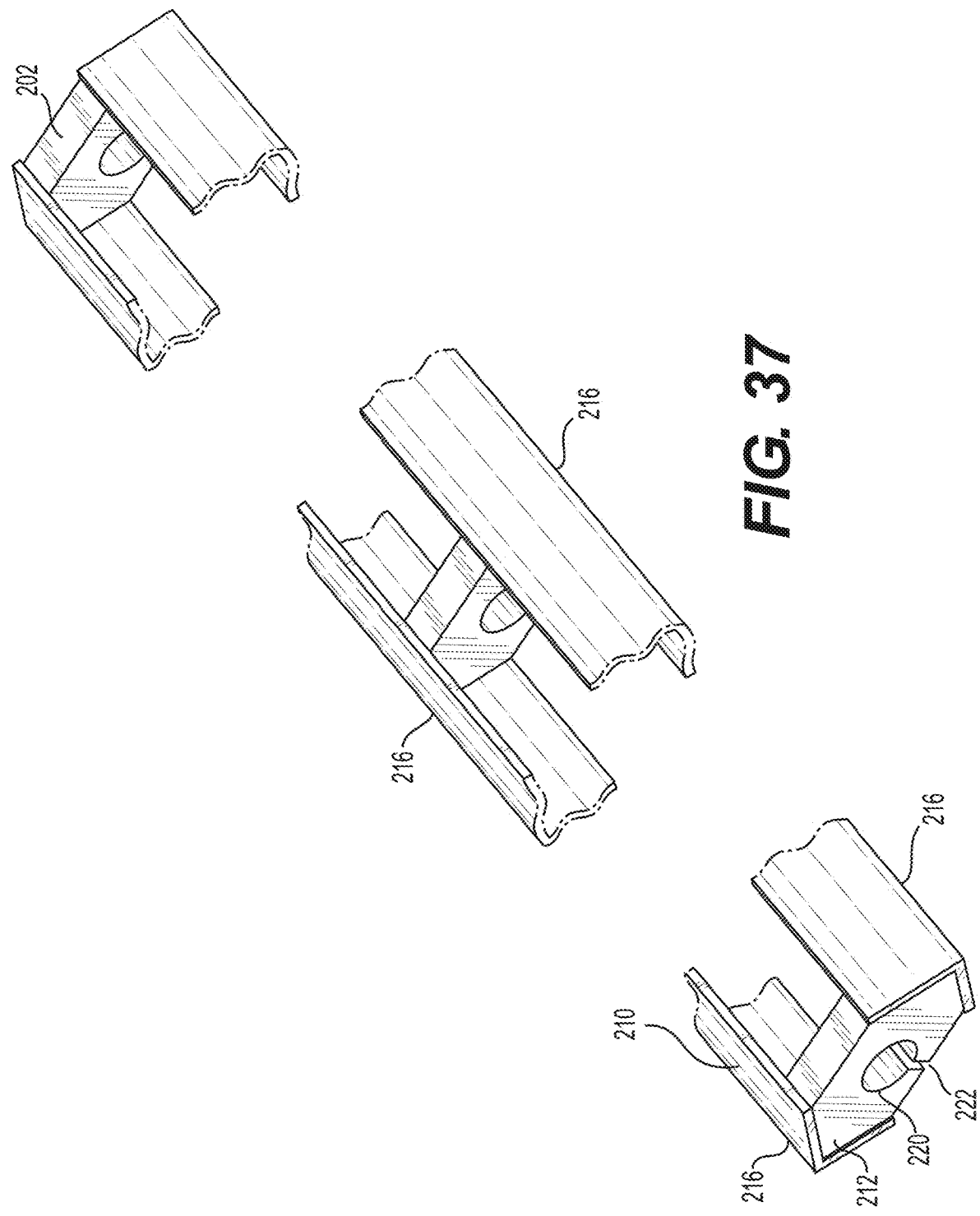
FIG. 37 is a top perspective view of a corner sleeper.
Figure 38:
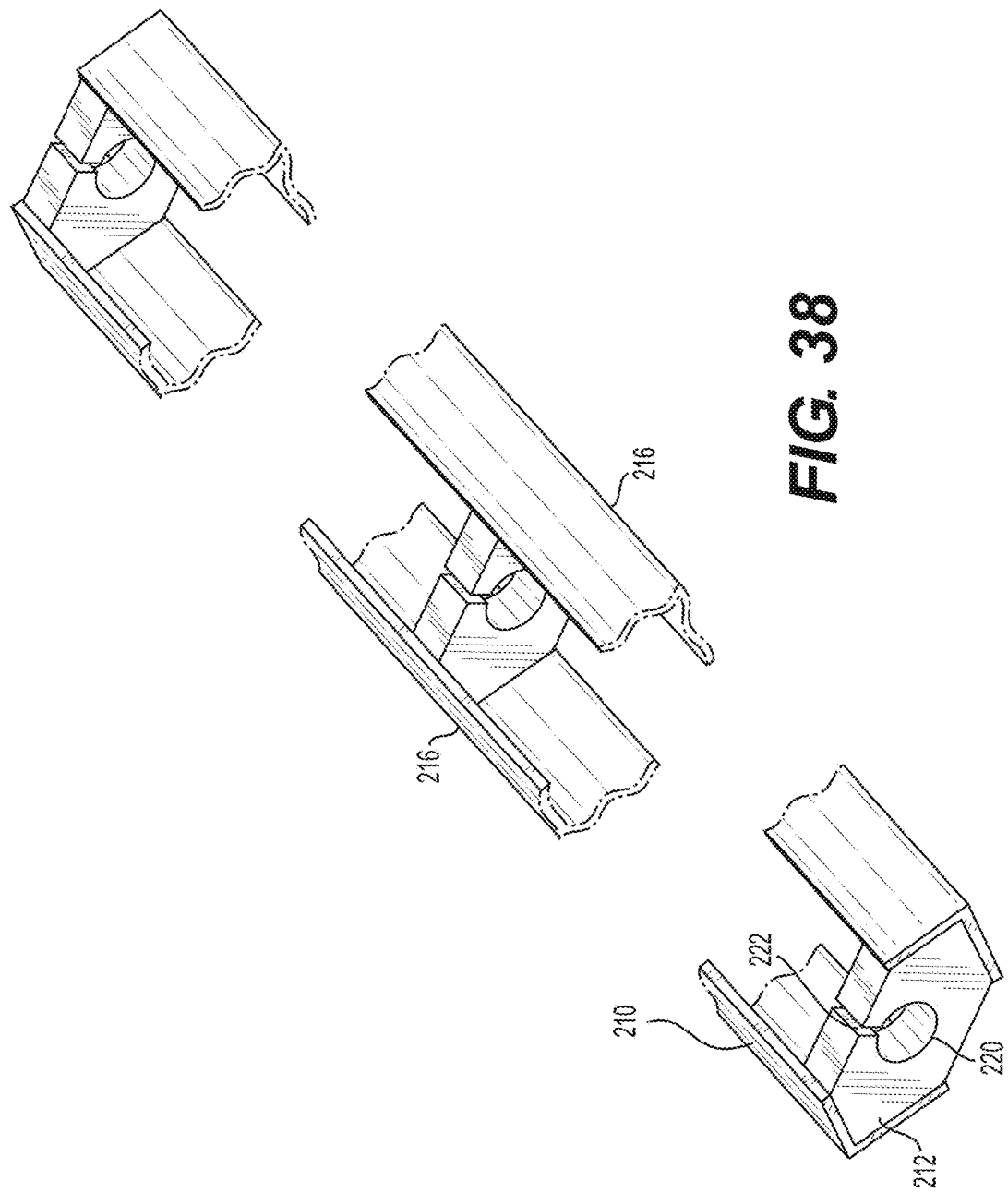
FIG. 38 is a bottom perspective view of the corner sleeper of FIG. 37.
Figure 39:
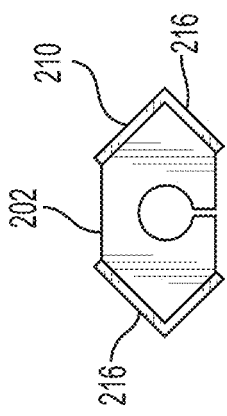
FIG. 39 is a first end view of the corner sleeper of FIG. 37.
Figure 40:
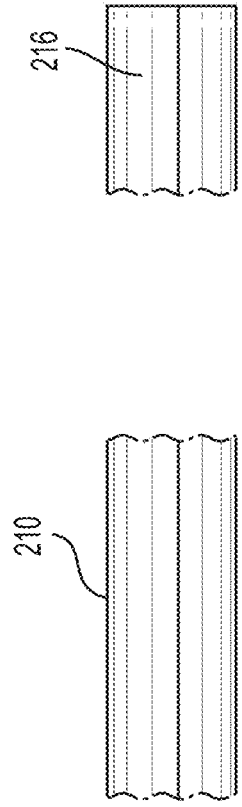
FIG. 40 is a second end view of the corner sleeper of FIG. 37.
Figure 41:
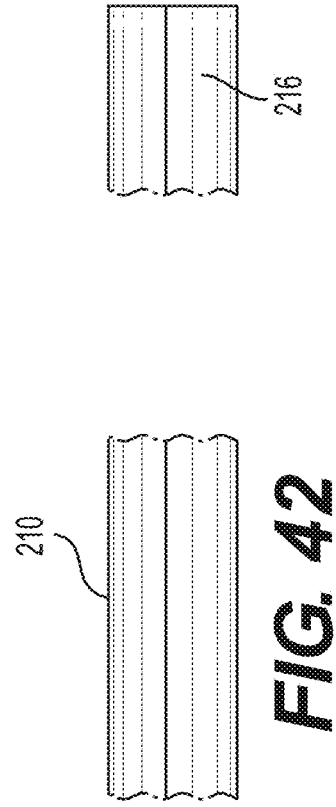
FIG. 41 is a first side view of the corner sleeper of FIG. 37.
Figure 42:
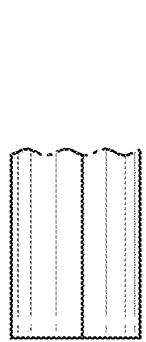
FIG. 42 is a second side view of the corner sleeper of FIG. 37.
Figure 44:
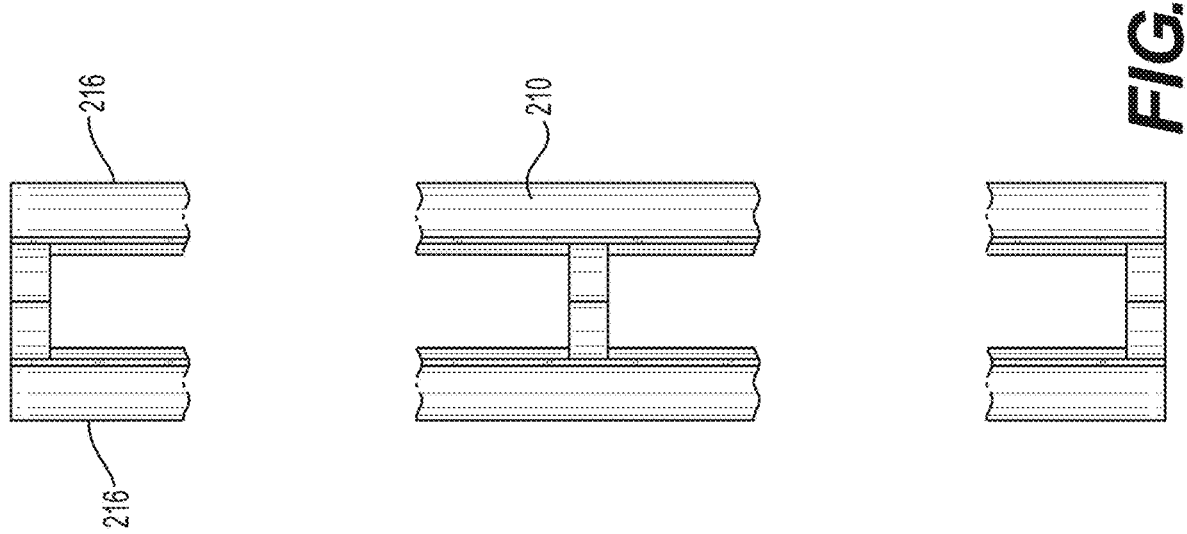
FIG. 44 is a bottom view of the corner sleeper of FIG. 37.
Figure 43:
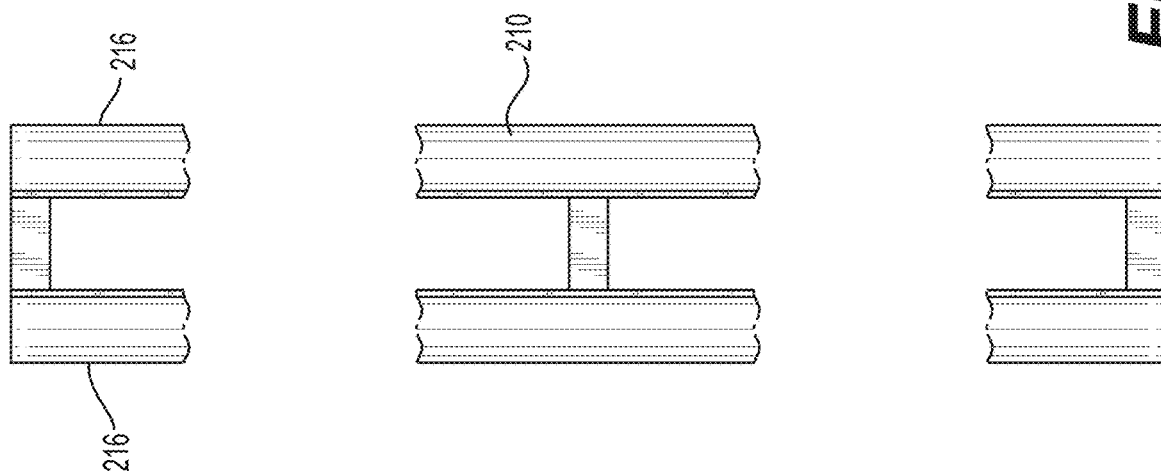
FIG. 43 is a top view of the corner sleeper of FIG. 37.
Figure 45:
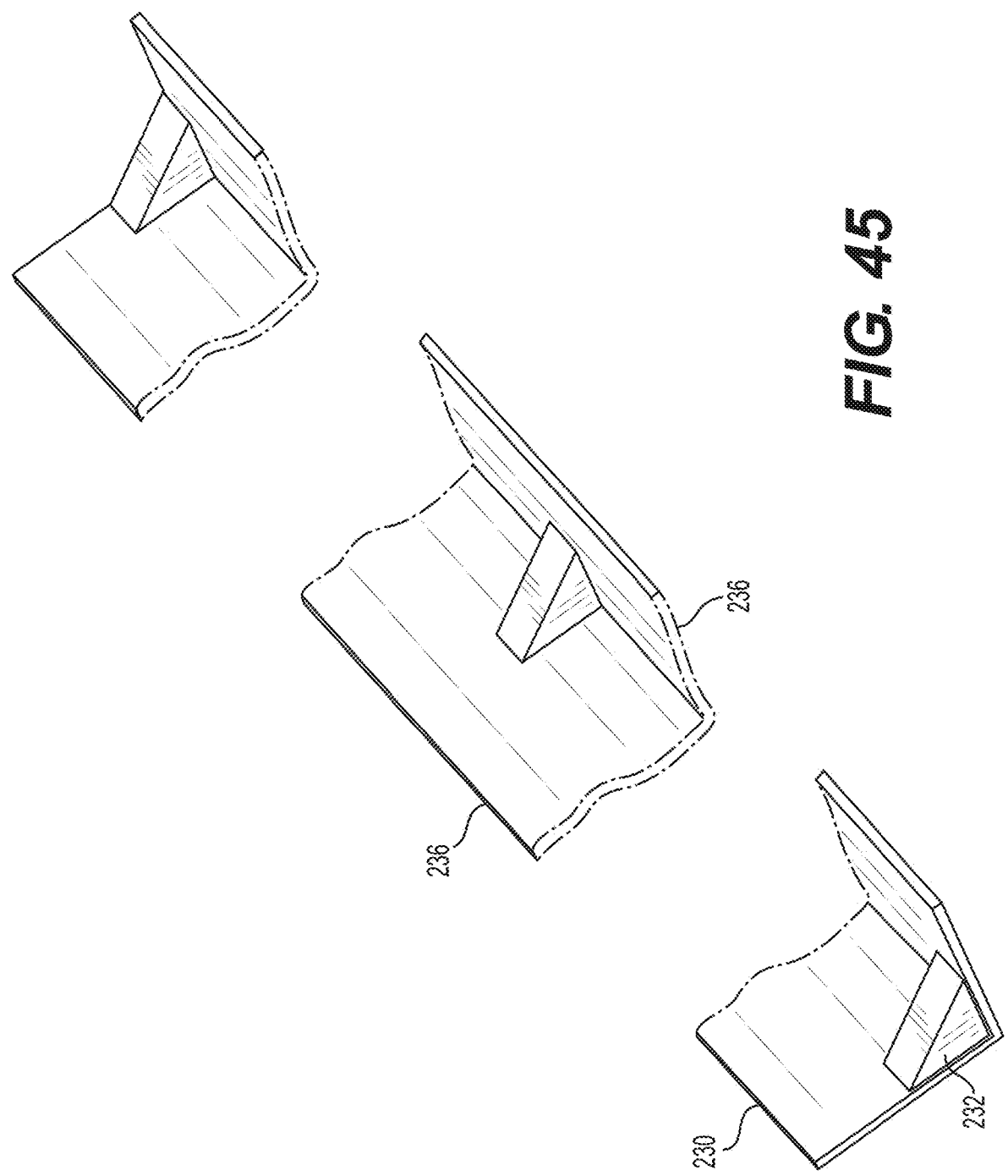
FIG. 45 is a top perspective view of a corner cover.
Figure 46:
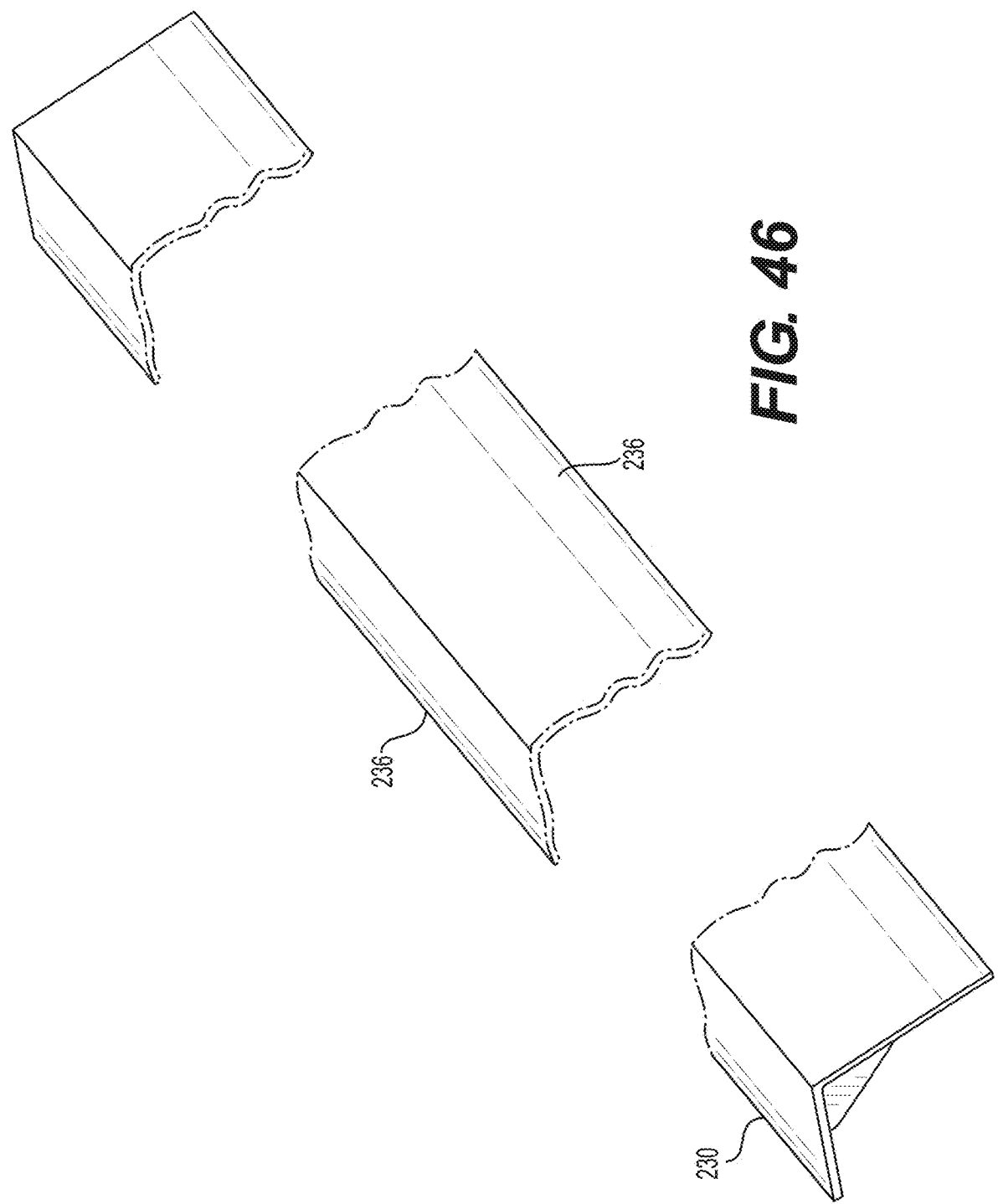
FIG. 46 is a bottom perspective view of the corner cover of FIG. 45.
Figure 47:
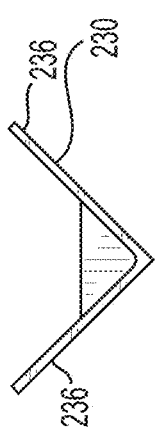
FIG. 47 is a first end view of the corner cover of FIG. 45.
Figure 49:
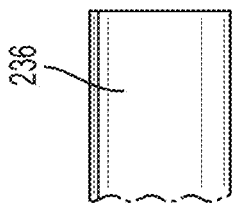
FIG. 49 is a first side view of the corner cover of FIG. 45.
Figure 48:
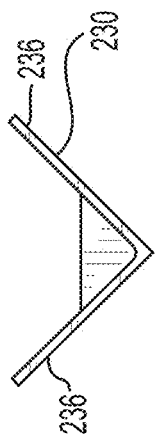
FIG. 48 is a second end view of the corner cover of FIG. 45.
Figure 50:
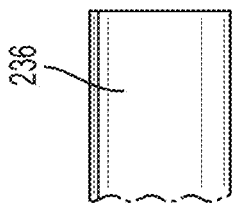
FIG. 50 is a second side view of the corner cover of FIG. 45.
Figure 52:
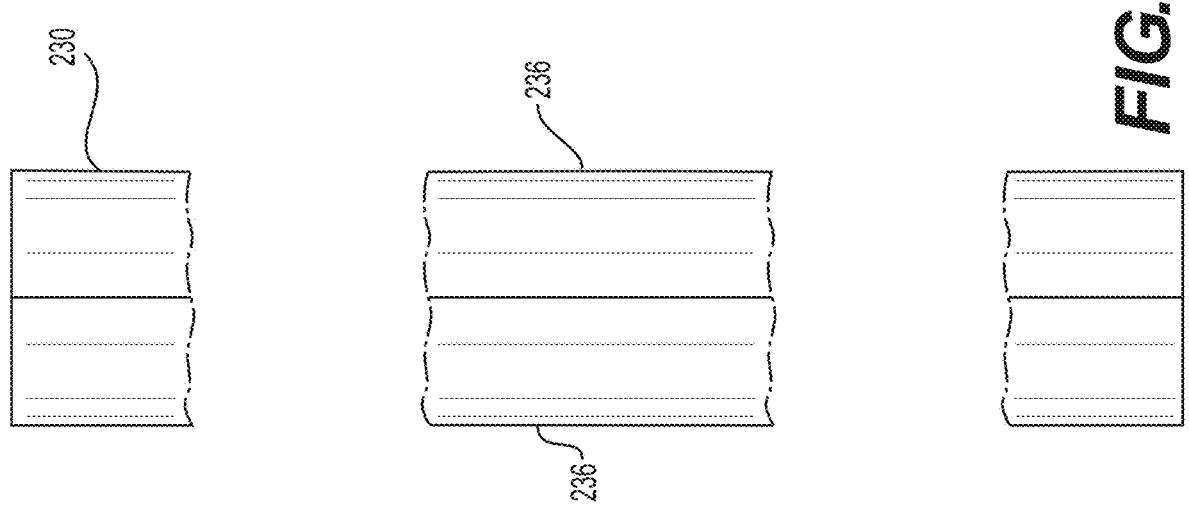
FIG. 52 is a bottom view of the corner cover of FIG. 45.
Figure 51:
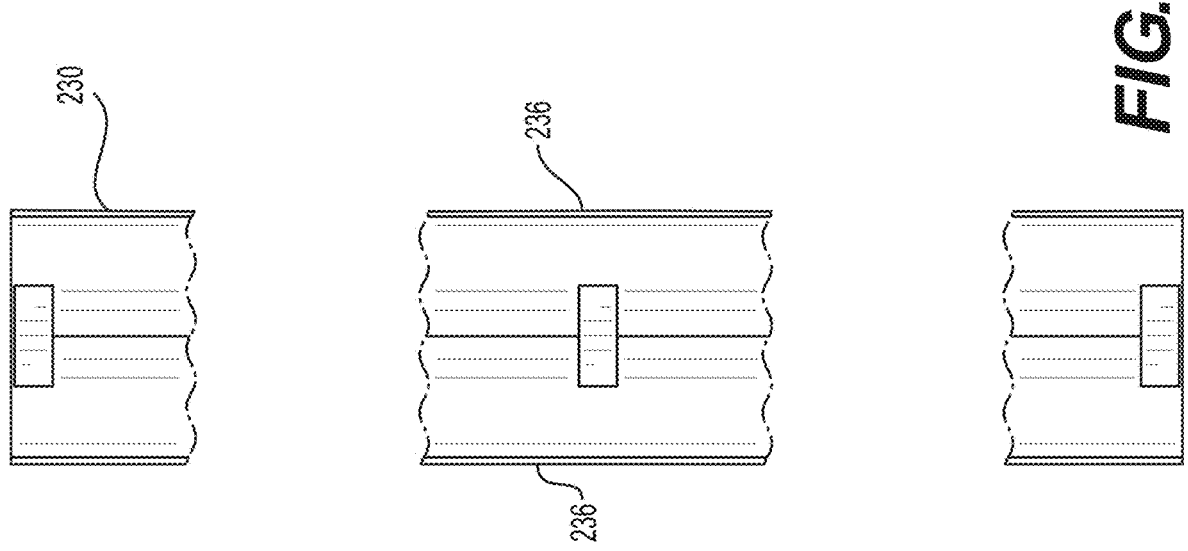
FIG. 51 is a top view of the corner cover of FIG. 45.
Figure 55:
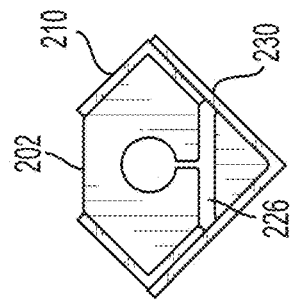
FIG. 55 is a first end view of the corner ornamental beam of FIG. 53.
Figure 57:
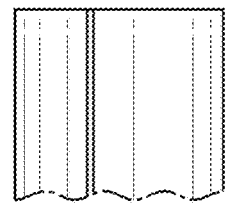
FIG. 57 is a first side view of the corner ornamental beam of FIG. 53.
Figure 58:
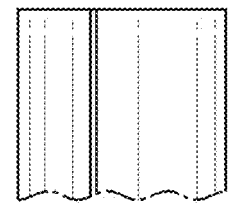
FIG. 58 is a second side view of the corner ornamental beam of FIG. 53.
Figure 56:
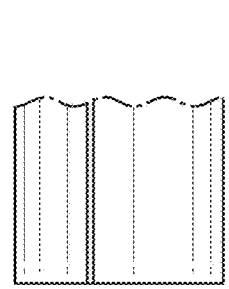
FIG. 56 is a second end view of the corner ornamental beam of FIG. 53.
Figure 60:
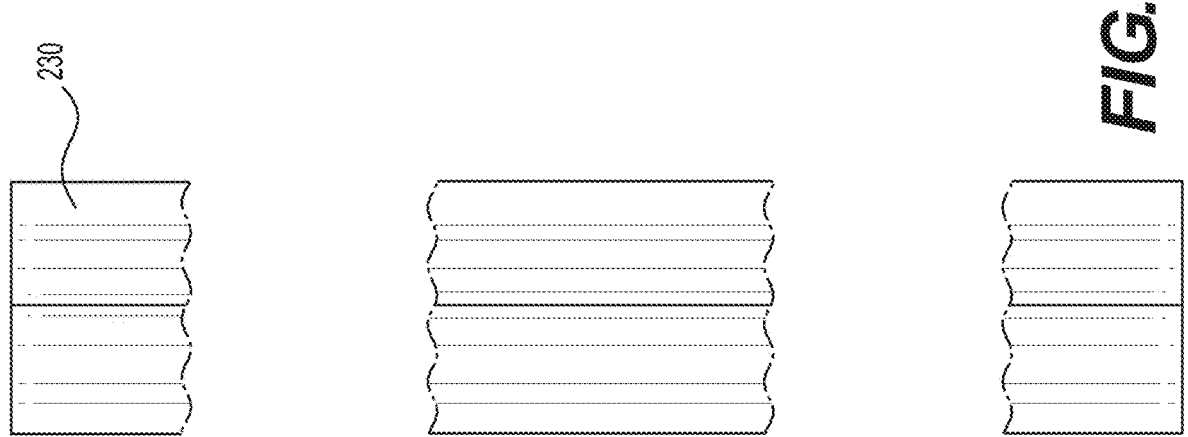
FIG. 60 is a bottom view of the corner ornamental beam of FIG. 53.
Figure 59:
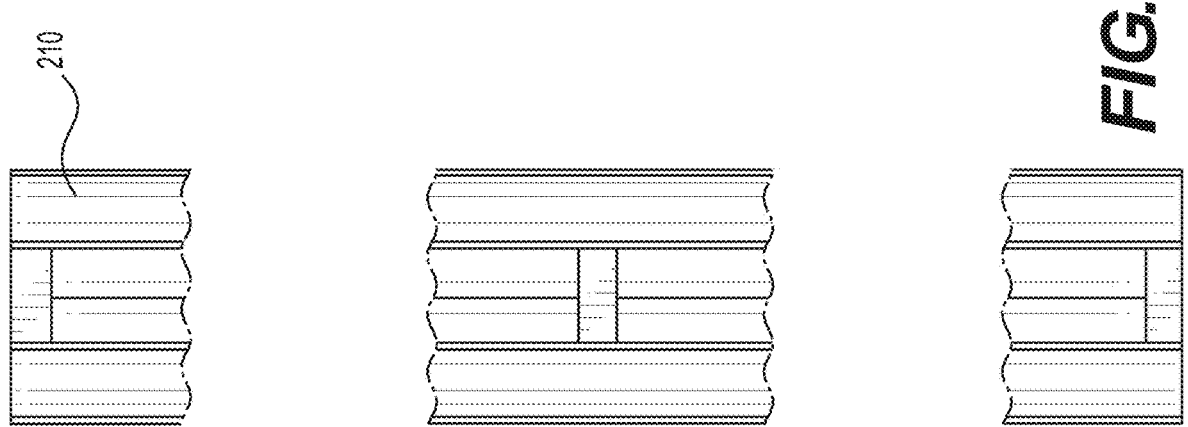
FIG. 59 is a top view of the corner ornamental beam of FIG. 53.

Described herein are both flat and corner ornamental beams 100, 200, each of which includes at least one sleeper 110, 210 and at least one cover 130, 230. Flat ornamental beams 100 are designed to be positioned on flat surfaces such as walls or ceilings. Corner ornamental beams 200 are designed to be positioned in the corners of walls and/or ceilings (e.g. the intersection of a wall and a ceiling or the intersection of two walls). FIGS. 1-3 show a progression of the installation of flat ornamental beams 100 and corner ornamental beams 200. FIGS. 4-5 show more detail of the installation of the flat ornamental beams 100. FIGS. 6-7 show more detail of the installation of the corner ornamental beams 200. FIGS. 8 and 9 show variations that may be implemented on some or all of the other ornamental beams 100, 200. FIG. 10 shows an exemplary flat ornamental beam 100 (including both a flat sleeper 110 and flat cover 130) with a mounting block 170 positioned between cover support ribs 132 and a speaker 180 suspended from the mounting block 170.

Exemplary ornamental beams 100, 200 may be better understood with reference to the drawings, but these ornamental beams 100, 200 are not intended to be of a limiting nature. The same reference numbers will be used throughout the drawings and description in this document to refer to the same or like parts. Some reference numbers (e.g. reference numbers ending with a single, double, or triple prime symbols (', ", or '")) refer to variations that could be used in the variations shown in other figures. Unless otherwise specified, all the variations may be referred to jointly by the general reference number (without the prime, double prime, or triple prime). The shown shapes and relative dimensions are preferred, but are not meant to be limiting unless specifically claimed, in which case they may limit the scope of that particular claim.

Flat Ornamental Beams

As set forth herein, the flat ornamental beams 100 are designed to be positioned on flat walls and ceilings. The flat ornamental beams 100 include at least one flat sleeper 110 (an exemplary flat sleeper 110 is shown in detail in FIGS. 11-18) and at least one flat cover 130 (an exemplary flat cover 130 is shown in detail in FIGS. 19-26). FIGS. 27-34 show detailed views of the flat ornamental beam 100 including both the flat sleeper 110 and the flat cover 130. FIGS. 8-9 and 35-36 show alternative flat ornamental beams or features that may be incorporated into other ornamental beams.

The shown flat sleeper 110 (FIGS. 11 and 12) has an elongate back 114 flanked on each elongate edge by an elongate side 116. In cross-section, the flat sleeper 110 may have a square bracket ([) shape with the free ends of the elongate sides 116 being slightly bent toward the longitudinal center of the back 114. FIG. 8 shows an alternative flat sleeper 110' that has a square bracket ([) shape with the sides 116' being perpendicular to the longitudinal back 114'. Like the general flat sleeper 110, both the alternative flat sleeper 110" (FIG. 9) and the alternative flat sleeper 110'" (FIGS. 35-36) may have a square bracket ([) shape with the free ends of the elongate sides 116", 116'" being slightly bent toward the longitudinal center of the back 114", 114'" (inwardly angled).

The shown flat sleeper 110 includes a plurality of sleeper support ribs 112 having bores 120 therein. The shown sleeper support ribs 112 have two faces and a plurality of peripheral edges that are substantially bounded by the back 114 and sides 116, except for at least one edge that is free from obstruction (shown as a single unobstructed edge). Each sleeper support rib 112 preferably has at least one bore 120 extending between the two faces. Although shown as having a single circular bore, each sleeper support rib could have an alternatively-shaped bore and/or multiple bores. Each bore 120 preferably has an access path 122 that extends from the unobstructed edge through to the bore 120. The access path 122 allows cables or wires 140 to be inserted into the bores 120. Respective bores 120 in a plurality of sleeper support ribs 112 form a raceway for cables or wires 140.

As shown, for example, in FIG. 4, the sleeper support ribs 112 may also have one or more sleeper connector channels 124 (that may extend through the sleeper elongate back 114) suitable for directing sleeper connectors 125 through the support ribs 112 and into the wall/ceiling. (Sleeper connectors 125 may be, for example, screws or nails.) Some preferred sleeper support ribs 112 are substantially rectangular. Most of the figures show rectangular sleeper support ribs 112. FIG. 8 shows a wider rectangular sleeper support rib 112'. FIG. 9 shows sleeper support rib 112" with sides angled to be flush with the inwardly angled elongate sides 116" of the alternative flat sleeper 110". FIGS. 35-36 show a taller rectangular sleeper support rib 112'" such that each sleeper support rib 112'" is flush with its respective cover support rib 132. The alternative flat sleepers 110', 110", and 110'" and flat sleeper support ribs 112', 112", and 112'" may be used in conjunction with or in place of the general flat sleeper 110 and general support ribs 112.

The shown flat cover 130 (FIGS. 19 and 20) has an elongate back 134 flanked on each elongate edge by an elongate side 136. In cross-section, the flat cover 130 may be three sides of a square or a rectangle. The elongate sides 136 of the flat cover 130 are preferably "deeper" than the elongate sides 116 of the flat sleeper 110 such that when the flat ornamental beams 100 are assembled, the elongate sides 136 of the flat cover 130 hide the elongate sides 116 of the flat sleeper 110. Put another way, the elongate length of the flat cover 130 is preferably at least substantially the same length as the flat sleeper 110, but the height of the flat cover sides 136 is greater (longer) than the height of the flat sleeper sides 116. Alternative flat covers could have flat cover sides that have the same height as the flat sleeper sides.

The shown flat cover 130 includes a plurality of cover support ribs 132. Some preferred cover support ribs 132 are substantially rectangular. (Alternatively-shaped covers would have alternatively-shaped support ribs that mate with the interior of the covers.) Preferably, each cover support rib 132 is positioned to be substantially coextensive with a corresponding sleeper support rib 112 when the flat ornamental beam 100 is assembled. (Put another way, sleeper support ribs 112 preferably match up or are aligned with respective cover support ribs 132.)

As shown in FIG. 4, cover connector channels 138 may be provided that extend through the cover sides 136 (above the cover support ribs 132), through the sleeper sides, and into the sides of the sleeper support ribs 112. The cover connector channels 138 are suitable for directing cover connectors 139 through the cover sides 136, through the sleeper sides, and through the support ribs 112 to secure the cover 130 to the sleeper 110. Cover connectors 139 may be, for example, screws or nails.

As shown in FIG. 5, when the flat ornamental beam 100 is assembled, it is preferable that each cover support rib 132 is positioned to be substantially coextensive with a corresponding sleeper support rib 112. After the flat sleeper 110 has been installed on a wall or ceiling (but before the flat cover 130 has been positioned over the flat sleeper 110), it is possible to insert cables or wires 140 through the access paths 122 and into the bores 120. (Technically, the wires 140 could be inserted prior to the step of attaching the sleeper.) The respective bores 120 in a plurality of sleeper support ribs 112 form a raceway for cables or wires 140. When the flat cover 130 has been installed over the flat sleeper 110 to complete the installation of the flat ornamental beam 100, the cover support ribs 132 block the respective access paths 122 and may help to prevent the cables or wires 140 from escaping from the bores 120.

As shown in FIGS. 5 and 27-34, there may be a gap 126 between the sleeper support rib 112 and the cover support rib 132 when the flat ornamental beam 100 is assembled. Alternatively, as shown in FIGS. 8-9 and 35-36, the sleeper support rib 112 (or alternative sleeper support rib 112', 112") may be flush with the cover support rib 132 when the flat ornamental beam 100', 100", 100'" is assembled. The presence or absence of a gap may be incorporated in any flat ornamental beam 100, 100', 100", 100'".

The different shapes and constructions of the components result in several alternatives. In the assembled flat sleeper 110 shown in FIGS. 5 and 27-34, there is a gap between the interior surface of the sleeper sides and the exterior surface of the support rib, there is a gap between the external surfaces of the sleeper sides and the internal surfaces of the cover sides 136, and there is a gap 126 between the sleeper support rib 112 and the cover support rib 132. In the alternative flat sleeper 110' shown in FIG. 8, there is no gap between the interior surface of the sleeper sides and the exterior surface of the sleeper support rib 112', there is no gap between the external surfaces of the sleeper sides and the internal surfaces of the cover sides 136, and there is no gap between the sleeper support rib 112' and the cover support rib 132. In the alternative flat sleeper 110" shown in FIG. 9, there is no gap between the interior surface of the sleeper sides and the exterior surface the sleeper support rib 112", there is a gap between the external surfaces of the sleeper sides and the internal surfaces of the cover sides 136, and there is no gap between the sleeper support rib 112" and the cover support rib 132. In the alternative flat sleeper 110'" shown in FIGS. 35-36, there is a gap between the interior surface of the sleeper sides and the exterior surface of the sleeper support rib 112'", there is a gap between the external surfaces of the sleeper sides and the internal surfaces of the cover sides 136, and there is no gap between the sleeper support rib 112'" and the cover support rib 132. Other configurations would be possible by changing the shapes and sizes of the components.

FIG. 8 shows a first alternative exemplary flat ornamental beam 100' (including both a flat sleeper 110' and flat cover 130'), there being no gap between the sleeper support rib 112' and the cover support rib 132, the sleeper support rib 112' being a wider rectangular sleeper support rib 112, the longitudinal sides 116' of the flat sleeper 100' being flush with the sides of the sleeper support rib 112' and the sides of the flat cover 136, and thin sheets of ornamental material 150 (e.g. wood) being attached (e.g. adhered) to the outer surfaces of the core 152 of the flat cover 130'.

FIG. 9 shows a second alternative exemplary flat ornamental beam 100" (including both a flat sleeper 110" and flat cover 130"), there being no gap between the sleeper support rib 112" and the cover support rib 132, the sleeper support rib 112" being shaped so that the exterior sides of the sleeper support rib 112" are flush with the inwardly angled longitudinal sides 116" of the flat sleeper 110", and a thin sheet of ornamental material 160 (e.g. a coating or a sticker having an ornamental design) being adhered to the outer surfaces of the core 162 of the flat cover 130".

Regardless of how it is accomplished, the outer surface 131 of the flat cover 130 preferably has an ornamental design such as wood grain, brick, texture, or any ornamental design known or yet to be discovered. When the flat cover 130 is positioned over the flat sleeper 110, the preferred flat ornamental beam 100 preferably has the appearance of being solid.

Corner Ornamental Beams

As set forth herein, the corner ornamental beams 200 are designed to be positioned in the corners of walls and ceilings. The corner ornamental beams 200 include at least one corner sleeper 210 (an exemplary corner sleeper 210 is shown in detail in FIGS. 37-44) and at least one corner cover 230 (an exemplary corner cover 230 is shown in detail in FIGS. 45-52). FIGS. 7 and 53-60 show detailed views of the assembled corner ornamental beam 200 including both the corner sleeper 210 and the corner cover 230.

It should be noted that the "top" (shown top) of the corner ornamental beams 200 (and its components) as shown in FIGS. 37-62 is actually the part of the beam that would be inserted into the longitudinal corners (e.g. longitudinal corners formed between a ceiling and a wall or formed between two walls). As installed, therefore, one of the longitudinal sides of the corner sleeper 210 is the "top" (installed top) when the corner ornamental beam 200 is installed. This installed orientation is shown correctly in FIGS. 1-3 and 6-7. For ease of discussion, the "top" of the corner ornamental beams 200 (and its components) will be the upper elongate corner 202 as shown in FIGS. 37-62

Assuming that the shown upper elongate corner 202 is the "top," the shown corner sleeper 210 has two elongated V-shaped "sides" 216 (first and second corner sleeper elongate sides 216). In cross-section, the sides 216 of the corner sleeper 210 look like a less-than sign (<) facing a greater-than sign (>). The shown corner sleeper 210 includes a plurality of sleeper support ribs 212. The sleeper support ribs 212 are shown as being shaped like a "squished" hexagon. The shown sleeper support ribs 212 have two faces and a plurality of peripheral edges that are substantially bounded by the sides 216, except for at least one edge that is free from obstruction (shown as two unobstructed edges, one at the "top" and one at the "bottom"). Each sleeper support rib 212 preferably has at least one bore 220 extending between the two faces. Although shown as having a single circular bore, each sleeper support rib could have an alternatively-shaped bore and/or multiple bores. Each bore 220 preferably has an access path 222 that extends from an unobstructed edge through to the bore 220. The access path 222 allows cables or wires 240 to be inserted into the bores 220. Respective bores 220 in a plurality of sleeper support ribs 212 form a raceway for cables or wires 240.

The sleeper support ribs 212 may also have one or more sleeper connector channels 224 (FIG. 6) suitable for directing sleeper connectors 225 through the support ribs 212 and into the wall/ceiling. (Sleeper connectors 225 may be, for example, screws or nails.)

The shown corner cover 230 (FIGS. 6, 7, and 45-62) has two elongate sides 236 (first and second elongate sides 236) connected at an at least substantially right angle. In cross-section, the corner cover 230 may be an "L" with the two "legs" (the two elongate sides 236) of the "L" having substantially the same length (two intersecting sides of a square). The elongate sides 236 are attached at an angle (e.g. an approximate right angle) along respective elongate edges. The shown corner cover 230 includes a plurality of cover support ribs 232. The cover support ribs 232 are shown as at least substantially triangular. Preferably, each cover support rib 232 is positioned along the longitudinal length of the corner cover 230 to be substantially coextensive with a corresponding sleeper support rib 212 when the corner ornamental beam 200 is assembled. (Put another way, sleeper support ribs 212 match up or are aligned with respective cover support ribs 232.)

Cover connector channels 238 (FIG. 6) may be provided that extend through the cover sides 236 (above the cover support ribs 232), through the sleeper sides, and into the sides of the sleeper support ribs 212. The cover connector channels 238 are suitable for directing cover connectors 239 through the cover sides 236, through the sleeper sides, and through the support ribs 212 to secure the cover 230 to the sleeper 210. (Cover connectors 239 may be, for example, screws or nails.)

When the corner ornamental beam 200 is assembled, as set forth herein, preferably each cover support rib 232 is positioned to be substantially coextensive with a corresponding sleeper support rib 212. After the corner sleeper 210 has been installed at the intersection of two flat surfaces (but before the corner cover 230 has been positioned over the corner sleeper 210), it is possible to insert cables or wires 240 through the access paths 222 and into the bores 220. (Technically, the wires 240 could be inserted prior to the step of attaching the sleeper.) As set forth herein, the respective bores 220 in a plurality of sleeper support ribs 212 form a raceway for cables or wires 240. When the corner cover 230 has been installed over the corner sleeper 210 to complete the installation of the corner ornamental beam 200, the cover support ribs 232 block the respective access paths 222, and may help to prevent the cables or wires 240 from escaping from the bores 220.

Figures 61, 62:
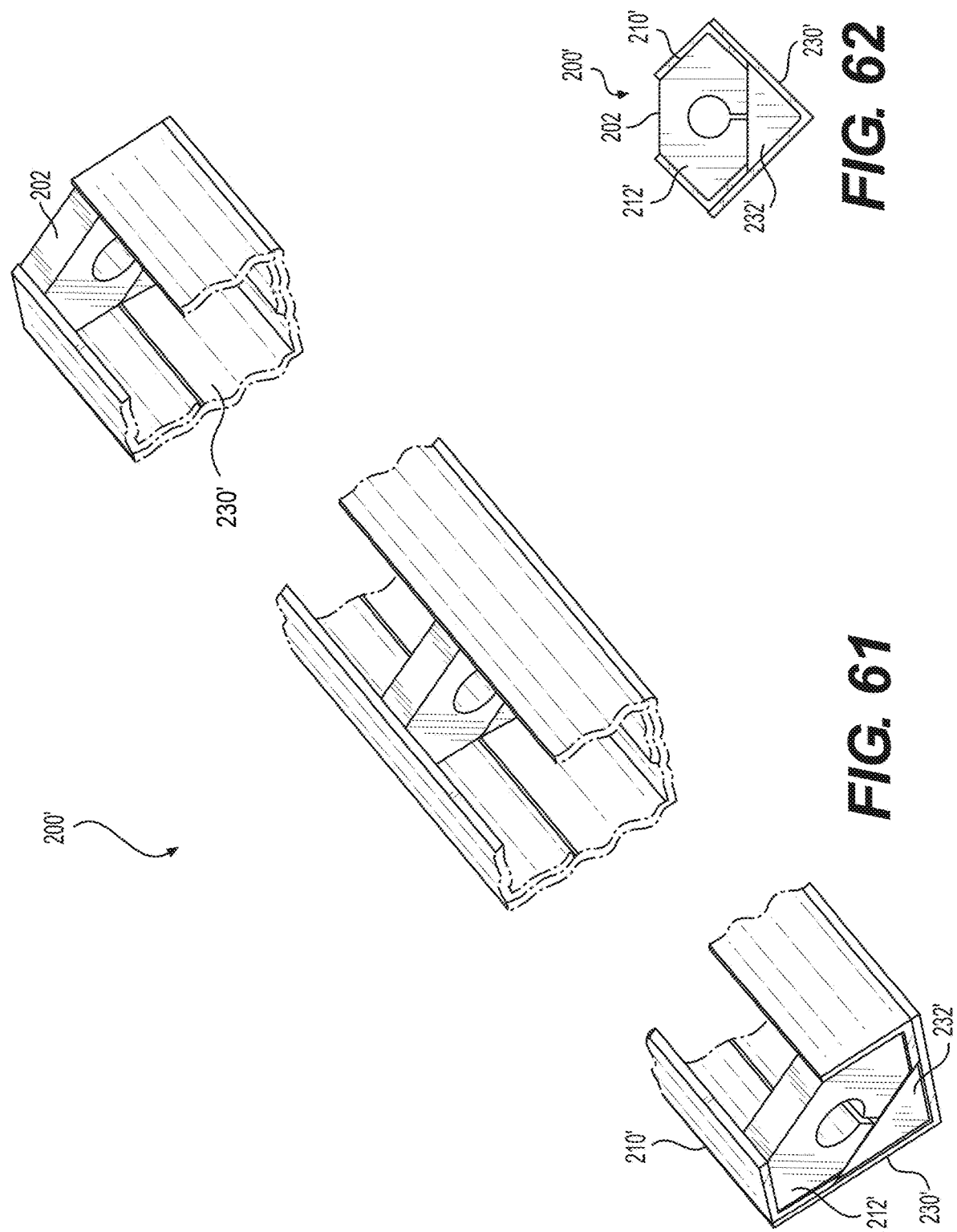
FIG. 61 is a top perspective view of a corner ornamental beam including a corner sleeper and a corner cover similar to the corner ornamental beam of FIG. 53, but with no gap between the corner sleeper support rib and the corner cover support rib.
FIG. 62 is an end view of the corner ornamental beam of FIG. 61.

FIGS. 61-62 show an alternative corner ornamental beam 200' or features that may be incorporated into other ornamental beams. The alternative corner ornamental beam 200' includes an alternative corner sleeper 210' with an alternative corner sleeper support rib 212'. The alternative corner ornamental beam 200' includes an alternative corner cover 230' with an alternative corner cover support rib 232'. The most significant difference between the corner ornamental beam 200 and the alternative corner ornamental beam 200' (and the respective components) is the dimensions of the components that together determine whether there is a gap 226 between the support ribs. More specifically, whereas the corner ornamental beam 200 (FIGS. 7, and 45-62) is shown with a gap 226 between the corner sleeper support rib 212 and the corner cover support rib 232, the alternative corner ornamental beam 200' (FIGS. 61-62) is shown without a significant gap (e.g. substantially flush) between the alternative corner sleeper support rib 212' and the alternative corner cover support rib 232'. Put another way, as shown in FIGS. 7 and 53-60 there may be a gap 226 between the corner sleeper 210 and the corner cover 230 in the assembled corner ornamental beam 200. Alternatively, as shown in FIGS. 61-62 the sleeper support rib 212' may be flush with the cover support rib 232' when the flat ornamental beam 100' is assembled. The presence or absence of a gap may be incorporated in any corner ornamental beam 200, 200'.

The outer surface 231 (FIGS. 6-7) of the corner cover 230 preferably has an ornamental design such as wood grain, brick, texture, or any ornamental design known or yet to be discovered. When the corner cover 230 is positioned over the corner sleeper 210, the preferred corner ornamental beam 200 preferably has the appearance of being solid.

Speakers and Lights:

FIG. 10 is an end view of an exemplary flat ornamental beam 100 (including both a flat sleeper 110 and flat cover 130) with a mounting block 170 positioned between support ribs 112 and a speaker 180 suspended from the mounting block 170. Although shown as a speaker 180, this embodiment could also support a light.

Connecting Bracket:

FIG. 63 is a perspective view showing an exemplary bracket 190 used to cover the ends of two adjacent ornamental beams 100. In some cases, the flat surface to be spanned is longer than available ornamental beams 100. In such a case, a bracket 190 may be used to hide the ends of two adjacent ornamental beams 100. The bracket 190 may be colored and textured to camouflage the ends of two adjacent ornamental beams 100. Alternatively, the bracket 190 may be colored and textured to provide an additional accent.

The bracket 190 may be structural in that it may provide additional strength to the connection. Alternatively, the bracket 190 may be completely ornamental.

Materials and Construction:

Both the flat and corner ornamental beams 100, 200 are constructed of lightweight material such that individuals can perform installation. For either the flat or corner ornamental beams 100, 200, the total weight of a ten-foot beam is preferably less than 5 pounds. Ideally, for either the flat or corner ornamental beams 100, 200, the total weight of a ten-foot beam is 1 pound or less.

The sleepers 110, 210 and covers 130, 230 are preferably made from a lightweight core material that is both rigid and foldable (or otherwise shapeable or moldable into appropriate configurations). One exemplary material that may be used as the core material is cardboard (which may be, for example, thick sheet paperboard or corrugated fiberboard). Alternative materials include, but are not limited to, plastic (which may be, for example, corrugated plastic or PVC), metal (which may be, for example, aluminum, magnesium, titanium, and beryllium alloys), lightweight wood (which may be, for example, balsa), biobased materials (which may be, for example, nanocellulose or cellulose composites), or other materials known or yet to be discovered that are lightweight, rigid, and foldable.

The support ribs 112, 132, 212, 232 are preferably made from a lightweight material. One exemplary material that may be used as the core material is a cushioning material such as foam (which may be, for example, polystyrene foam). Alternatively, plastic (which may be, for example, corrugated plastic), cardboard, rubber, wood, or other materials known or yet to be discovered that are lightweight and may be formed, adapted, or otherwise created or modified in the shown one or more of the forms.

Some preferred flat and corner ornamental beams 100, 200 have safety structure such that it is safe to use the beams 100, 200 as raceways for cables or wires 140, 240. The interior (and/or the exterior) of the sleepers 110, 210 and covers 130, 230 are designed to be suitable for safely handling cables or wires that may carry electricity (e.g. power cables or wires). Accordingly, there may be, for example, coating or insulation to prevent electrical dangers such as fire.

Some preferred flat and corner ornamental beams 100, 200 have signal structure such that there are no problems using the beams 100, 200 as raceways for cables or wires 140, 240 carrying signals. The interior (and/or the exterior) of the sleepers 110, 210 and covers 130, 230 are designed suitable for optimally handling cables or wires that may carry signals (e.g. cables or wires for stereos, computers, or lighting). Accordingly, there may be, for example, coating or insulation to enhance or optimize signal transmission.

As set forth herein, the outer surface 131, 231 of the covers 130, 230 preferably have an ornamental design such as wood grain, brick, texture, or any ornamental design known or yet to be discovered. FIG. 8 and FIG. 9 show two preferred ways of accomplishing this using ornamental material 150 (FIG. 8) and ornamental material 160 (FIG. 9). Ornamental material 150 (which may be thin wood having adhesive on one side) is shown as being thicker than the ornamental material 160 (which may be a sticker-type material).

Installation:

FIGS. 1-3 show a progression of the installation of flat ornamental beams 100. FIGS. 4-5 show more detail of the installation of the flat ornamental beams 100. FIGS. 1-3 also show a progression of the installation of corner ornamental beams 200. FIGS. 6-7 show more detail of the installation of the corner ornamental beams 200.

FIG. 1 shows sleepers 110, 210 installed (attached) along flat surfaces (both the wall and the ceiling) and along corner surfaces (both the wall and the ceiling) which is a preferred early step in the installation of flat ornamental beams 100 and corner ornamental beams 200 described herein. Sleeper connectors 125, 225 may be used to connect the sleepers 110, 210 to the wall/ceiling.

FIG. 2 shows wires 140, 240 installed (inserted) through the bores 120, 220 in support ribs 112, 212 of the sleepers 110, 210 (both the flat sleepers and the corner sleepers) which is a preferred middle step in the installation of flat ornamental beams 100 and corner ornamental beams 200 described herein. If the bores 120, 220 have access paths 122, 222, the wires 140, 240 may be pushed through the access paths 122, 222 and into the bores 120, 220. FIG. 4 is an expanded perspective view showing a flat sleeper 110 installed along a flat surface, cables or wires 140 installed through the bores 120 in support ribs 112 of the sleeper 110, and with the flat cover 130 moving toward the flat sleeper 110 to be secured. FIG. 6 is an expanded perspective view showing a corner sleeper 210 installed along a corner surface, cables or wires 240 installed through the bores 220 in support ribs 212 of the corner sleeper 210, and with the corner cover 230 moving toward the corner sleeper 210 to be secured.

FIG. 3 shows covers 130, 230 (both the flat sleepers and the corner covers) being secured to the sleepers 110, 210 (both the flat sleepers and the corner sleepers) which is a preferred late step in the installation of flat ornamental beams 100 and corner ornamental beams 200 described herein. Cover connectors 139, 239 may be used to connect the covers 130, 230 to the sleepers 110, 210. FIG. 5 is a perspective view showing the flat sleeper 110 of FIG. 4 installed along a flat surface, cables or wires 140 installed through the bores in support ribs 112 of the flat sleeper 110, and the flat cover 130 of FIG. 4 secured to the flat sleeper 110. FIG. 7 is a perspective view showing the corner sleeper 210 of FIG. 6 installed along a corner surface, cables or wires 240 installed through the bores 220 in support ribs 212 of the corner sleeper 210, and the corner cover 230 of FIG. 6 secured to the corner sleeper 210.

Please note that the terms and phrases used herein may have additional definitions and/or examples throughout the specification. Where otherwise not specifically defined, words, phrases, and acronyms are given their ordinary meaning in the art. The following paragraphs provide basic parameters for interpreting terms and phrases used herein.

It should be noted that relative terms (e.g. early, middle, and late) are meant to help in the understanding of the technology and are not meant to limit the scope of the invention. Similarly, unless specifically stated otherwise, the terms "first," "second," and "third" are meant solely for purposes of designation and not for order or limitation.

It should be noted that some terms used in this specification are meant to be relative. For example, the term "top" is meant to be relative to the term "bottom." The term "front" is meant to be relative to the term "back," and the term "side" is meant to describe a "face" or "view" (that, in some cases, connects the "front" and the "back"). Rotation of the system or component that would change the designation might change the terminology, but not the concept.

The terms "may," "might," "can," and "could" are used to indicate alternatives and optional features and only should be construed as a limitation if specifically included in the claims. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. An ornamental beam, comprising:
   (a) at least one sleeper, each sleeper having a plurality of sleeper support ribs, each sleeper support rib having at least one bore therein, each at least one bore of each sleeper support rib having an access path that extends from an unobstructed edge of the sleeper support rib through to said bore; and
   (b) at least one cover, each cover having a plurality of cover support ribs wherein the plurality of cover support ribs do not have any bores or access paths on them;
   (c) wherein when said ornamental beam is assembled with said at least one cover covering said at least one sleeper, each cover support rib is positioned to be substantially coextensive with a respective corresponding sleeper support rib.

2. The ornamental beam of claim 1, wherein said bores in said plurality of sleeper support ribs form a raceway for cables or wires.

3. The ornamental beam of claim 1, said ornamental beam being a flat ornamental beam.

4. The ornamental beam of claim 1, said ornamental beam being a flat ornamental beam, said at least one sleeper being a flat sleeper, and said at least one cover being a flat cover, said flat ornamental beam comprising:
   (a) said flat sleeper comprising:
      (i) an elongate back having elongate edges;
      (ii) elongate sides, each elongate edge of said elongate back flanked by one of said elongate sides; and
      (iii) said plurality of sleeper support ribs positioned at intervals along the length of said flat sleeper; and
   (b) said flat cover comprising:
      (i) an elongate back having elongate edges;
      (ii) elongate sides, each elongate edge of said elongate back flanked by one of said elongate sides; and
      (iii) said plurality of cover support ribs positioned at intervals along the length of said flat cover.

5. The ornamental beam of claim 1, said ornamental beam being a corner ornamental beam.

6. The ornamental beam of claim 1, said ornamental beam being a corner ornamental beam, said at least one sleeper being a corner sleeper, and said at least one cover being a corner cover, said corner ornamental beam comprising:
   (a) said corner sleeper comprising:
      (i) a first V-shaped elongate side;
      (ii) a second V-shaped elongate side; and
      (iii) said plurality of sleeper support ribs positioned at intervals along the length of said corner sleeper; and
   (b) said corner cover comprising:
      (i) a first elongate side;
      (ii) a second elongate side; and
      (iii) said plurality of cover support ribs positioned at intervals along the length of said corner cover.

7. An ornamental beam, comprising:
   (a) at least one sleeper, each sleeper having a plurality of sleeper support ribs, each sleeper support rib having at least one bore therein, each at least one bore of each sleeper support rib having an access path that extends from an unobstructed edge of the sleeper support rib through to said bore, said bores in said plurality of sleeper support ribs forming a raceway for cables or wires; and (b) at least one cover, each cover having a plurality of cover support ribs wherein the plurality of cover support ribs do not have any bores or access paths on them;

(c) wherein when said ornamental beam is assembled with said at least one cover covering said at least one sleeper, each cover support rib is positioned to be substantially coextensive with a respective corresponding sleeper support rib.

8. The ornamental beam of claim 7, said ornamental beam being a flat ornamental beam.

9. The ornamental beam of claim 7, said ornamental beam being a flat ornamental beam, said at least one sleeper being a flat sleeper, and said at least one cover being a flat cover, said flat ornamental beam comprising:

(a) said flat sleeper comprising:
  (i) an elongate back having elongate edges;
  (ii) elongate sides, each elongate edge of said elongate back flanked by one of said elongate sides; and
  (iii) said plurality of sleeper support ribs positioned at intervals along the length of said flat sleeper; and (b) said flat cover comprising:
  (i) an elongate back having elongate edges;
  (ii) elongate sides, each elongate edge of said elongate back flanked by one of said elongate sides; and
  (iii) said plurality of cover support ribs positioned at intervals along the length of said flat cover.

10. The ornamental beam of claim 7, said ornamental beam being a corner ornamental beam.

11. The ornamental beam of claim 7, said ornamental beam being a corner ornamental beam, said at least one sleeper being a corner sleeper, and said at least one cover being a corner cover, said corner ornamental beam comprising:

(a) said corner sleeper comprising:
  (i) a first V-shaped elongate side;
  (ii) a second V-shaped elongate side; and
  (iii) said plurality of sleeper support ribs positioned at intervals along the length of said corner sleeper; and (b) said corner cover comprising:
  (i) a first elongate side;
  (ii) a second elongate side; and
  (iii) said plurality of cover support ribs positioned at intervals along the length of said corner cover.

12. The ornamental beam of claim 1, said at least one cover having outer surfaces, said outer surfaces having an ornamental design thereon.

13. The ornamental beam of claim 1, said at least one cover having outer surfaces, said outer surfaces having attached ornamental material thereon.

14. The ornamental beam of claim 7, said at least one cover having outer surfaces, said outer surfaces having an ornamental design thereon.

15. The ornamental beam of claim 7, said at least one cover having outer surfaces, said outer surfaces having attached ornamental material thereon.

16. A method for installing an ornamental beam, said method comprising the steps of:

(a) providing an ornamental beam comprising:
  (i) at least one sleeper, each sleeper having a plurality of sleeper support ribs, each sleeper support rib having at least one bore therein; and
  (ii) at least one cover, each cover having a plurality of cover support ribs wherein the plurality of cover support ribs do not have any bores on them, said at least one cover having outer surfaces,
  (iii) said outer surfaces having attached ornamental material thereon;

(b) attaching said at least one sleeper to a flat surface;

(c) inserting wires through each said at least one bore of a plurality of said plurality of sleeper support ribs, wherein inserting wires is through an access path that extends from an unobstructed edge of the sleeper support rib through to said bore;

(d) securing said at least one cover to cover a respective said at least one sleeper;

wherein when said ornamental beam is assembled with said at least one cover covering said at least one sleeper, each cover support rib is positioned to be substantially coextensive with a respective corresponding sleeper support rib.

17. The method claim 16, said step of attaching said at least one sleeper to a flat surface further comprising using sleeper connectors used to attach said at least one sleeper to a flat surface.

18. The method claim 16, said step of securing said at least one cover to cover a respective said at least one sleeper further comprising using cover connectors to secure said at least one cover to cover a respective said at least one sleeper.

* * * * *